(12) United States Patent
Kamura et al.

(10) Patent No.: US 11,884,869 B2
(45) Date of Patent: *Jan. 30, 2024

(54) LATENT HEAT STORAGE MATERIAL, AND COLD STORAGE TOOL, LOGISTIC PACKAGING CONTAINER, FOOD COLD STORAGE TOOL AND COOLING METHOD EACH USING SAME

(71) Applicant: SHARP KABUSHIKI KAISHA, Sakai (JP)

(72) Inventors: Masakazu Kamura, Sakai (JP); Kyohei Sezukuri, Sakai (JP); Yuka Utsumi, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 860 days.

This patent is subject to a terminal disclaimer.

(21) Appl. No.: 16/964,454

(22) PCT Filed: Jan. 23, 2019

(86) PCT No.: PCT/JP2019/002042
§ 371 (c)(1),
(2) Date: Jul. 23, 2020

(87) PCT Pub. No.: WO2019/151074
PCT Pub. Date: Aug. 8, 2019

(65) Prior Publication Data
US 2021/0047549 A1    Feb. 18, 2021

(30) Foreign Application Priority Data

Jan. 31, 2018  (JP) .................................. 2018-015653

(51) Int. Cl.
*C09K 5/06* (2006.01)
*B65D 81/18* (2006.01)
(Continued)

(52) U.S. Cl.
CPC ................ *C09K 5/066* (2013.01); *A23B 7/04* (2013.01); *A23L 3/36* (2013.01); *B65D 81/18* (2013.01); *A23V 2002/00* (2013.01)

(58) Field of Classification Search
CPC . C09K 5/02; C09K 5/06; C09K 5/063; C09K 5/066; Y02E 60/14; Y02E 60/145;
(Continued)

(56) References Cited

U.S. PATENT DOCUMENTS

| 6,237,346 | B1 * | 5/2001 | Ogoshi | C09K 5/066 62/4 |
| 7,967,999 | B2 * | 6/2011 | Tomura | C09K 5/063 165/104.19 |
| 2017/0226394 | A1 * | 8/2017 | Ide | C09K 5/063 |

FOREIGN PATENT DOCUMENTS

| CN | 106675525 A | * | 5/2017 |
| JP | 09291272 A | * | 11/1997 |

(Continued)

*Primary Examiner* — Matthew R Diaz
(74) *Attorney, Agent, or Firm* — ScienBiziP, P.C.

(57) ABSTRACT

Provided are a latent heat storage material that changes the phase within a prescribed temperature range, and a cold storage tool, a logistic packaging container, and a food cold storage tool each using the latent heat storage material, and a cooling method. The latent heat storage material includes a tetrabutylammonium ion and a bromide ion constituting tetrabutylammonium bromide, a potassium ion and a nitrate ion constituting potassium nitrate, and water. The molar ratio of potassium nitrate to tetrabutylammonium bromide is 0.3 or more and 1.3 or less, and the molar ratio of water to tetrabutylammonium bromide is 22 or more and 32 or less.

11 Claims, 17 Drawing Sheets

(51) Int. Cl.
*A23B 7/04* (2006.01)
*A23L 3/36* (2006.01)

(58) Field of Classification Search
CPC .......... Y02E 60/147; A23B 7/04; A23L 3/36; A23V 2002/00; B65D 81/18
See application file for complete search history.

(56) References Cited

FOREIGN PATENT DOCUMENTS

| | | | |
|---|---|---|---|
| JP | H09-291272 A | | 11/1997 |
| JP | 2004331935 A | * | 11/2004 |
| JP | 2005036060 A | * | 2/2005 |
| JP | 2017179298 A | * | 10/2017 |
| WO | WO-2012169549 A1 | * | 12/2012 ............. C09K 5/063 |
| WO | 2016/002596 A1 | | 1/2016 |
| WO | WO-2016002596 A1 | * | 1/2016 ............... A61F 7/00 |

\* cited by examiner t: TBAB POWDER (TETRAGONAL), i: ICE (HEXAGONAL), k: KNO3 POWDER (ORTHORHOMBIC)

… (1) …

LATENT HEAT STORAGE MATERIAL, AND COLD STORAGE TOOL, LOGISTIC PACKAGING CONTAINER, FOOD COLD STORAGE TOOL AND COOLING METHOD EACH USING SAME

TECHNICAL FIELD

The present invention relates to a latent heat storage material, and a cold storage tool, a logistic packaging container, and a food cold storage tool each using the latent heat storage material, and a cooling method.

This application claims priority from Japanese Patent Application No. 2018-015653, filed Jan. 31, 2018, the disclosure of which is hereby incorporated by reference herein in its entirety.

BACKGROUND ART

When goods that require temperature control to maintain quality are transported, the goods are controlled within the temperature range appropriate for them. For example, when foods are transported, it is required to store, manage, and transport the foods at an appropriate temperature to keep them fresh.

When foods are transported, the range of temperature (storage temperature) to be maintained varies depending on the type of the foods. In the case of greengrocery, such as vegetables and fruits, the storage temperature is said to be higher than 0° C. and 15° C. or less. In contrast, in the case of refrigerated products including dairy products such as milk and processed foods such as ham, the storage temperature is said to be higher than 0° C. and 10° C. or less.

In general, transportation of foods is performed by collecting various foods from the producers and sorting and then delivering them for each customer. During such a process, the foods may be stored in a refrigerating room (warehouse) whose temperature is electrically controlled at 3° to 5° C.

In contrast, when foods are stored in a place where there is no electrical facilities during the transportation or are transported by a vehicle that is not equipped with electrical facilities, the foods are generally placed in a container having a heat insulating property together with a cold storage material and are cooled by the cold storage material.

In addition, in order to transport medicine or the like, it is necessary to control the temperature of the article to be transported to 2° C. or more and 8° C. or less.

Based on the above, it can be said that cold storage materials having a melting start temperature and a melting temperature of higher than 5° C. and 10° C. or less are in high demand. Such a cold storage material can be used also for cooling greengrocery and refrigerated products and also for cooling medicine. In addition, since the cold storage material does not melt in a refrigerating room, it is possible to prolong the cooling time of the cold storage material.

Tetradecane (melting start temperature: 5.1° C., melting temperature: 5.8° C.) has been known as a material having a melting start temperature and a melting temperature within a temperature range of higher than 5° C. and 10° C. or less. However, tetradecane is an inflammable liquid and a volatile organic compound (VOC) and is therefore unsuitable for application to foods as it is. In practical application of a cold storage material using tetradecane as a material, a countermeasure, for example, an increase in viscosity of tetradecane by using a thickener or the like, is necessary. Consequently, problems that a reduction in latent heat value of tetradecane due to the thickener and a high cost are caused.

In contrast, the semi-clathrate hydrates of quaternary ammonium salts are noncombustible and are highly safe. In the semi-clathrate hydrates of quaternary ammonium salts, tetrabutylammonium nitrate (melting start temperature: 5.1° C., melting temperature: 5.5° C.) is known as a material having a melting start temperature within a temperature range of higher than 5° C. and 10° C. or less. Tetrabutylammonium nitrate is synthesized from a halogenated tetrabutylammonium, such as tetrabutylammonium bromide (TBAB) (see PTL 1).

CITATION LIST

Patent Literature

PTL 1: Japanese Unexamined Patent Application Publication No. 9-291272

SUMMARY OF INVENTION

Technical Problem

Tetrabutylammonium nitrate has a problem that the cost is high compared to that of halogenated tetrabutylammonium as a raw material.

An aspect of the present invention has been made in view of the above circumstances, and it is an object thereof to provide a latent heat storage material that changes the phase within a prescribed temperature range, and a cold storage tool, a logistic packaging container, and a food cold storage tool each using the latent heat storage material, and a cooling method.

Solution to Problem

An aspect of the present invention provides a latent heat storage material including a tetrabutylammonium ion and a bromide ion constituting tetrabutylammonium bromide, a potassium ion and a nitrate ion constituting potassium nitrate, and water, wherein the molar ratio of potassium nitrate to tetrabutylammonium bromide is 0.3 or more and 1.3 or less, and the molar ratio of water to tetrabutylammonium bromide is 22 or more and 32 or less.

In an aspect of the present invention, the molar ratio of potassium nitrate to tetrabutylammonium bromide may be 0.5 or more and 0.8 or less, and the molar ratio of water to tetrabutylammonium bromide may be 24 or more and 30 or less.

In an aspect of the present invention, the molar ratio of potassium nitrate to tetrabutylammonium bromide may be 0.6 or more and 1.0 or less, and the molar ratio of water to tetrabutylammonium bromide may be 26 or more and 32 or less.

In an aspect of the present invention, the molar ratio of potassium nitrate to tetrabutylammonium bromide may be 0.6 or more and 0.8 or less, and the molar ratio of water to tetrabutylammonium bromide may be 26 or more and 30 or less.

An aspect of the present invention provides a cold storage tool including the latent heat storage material and an accommodation portion for accommodating the latent heat storage material in a liquid-tight state.

An aspect of the present invention may be a configuration including a plurality of accommodation portions and a joint for connecting the plurality of the accommodation portions to each other.

An aspect of the present invention provides a logistic packaging container including the cold storage tool.

An aspect of the present invention may be a configuration including a holding member for holding the cold storage tool.

An aspect of the present invention provides a logistic packaging container including the cold storage tool.

An aspect of the present invention provides a food cold storage tool including the cold storage tool.

An aspect of the present invention provides a cooling method by surrounding an object to be kept cold with the cold storage tool along a circumferential direction of a first axis that is assumed to pass through the object to be kept cold.

In an aspect of the present invention, the method may be a method by surrounding an object to be kept cold with the cold storage tool along a circumferential direction of a second axis that is assumed to pass through the object to be kept cold and to intersect the first axis.

Advantageous Effects of Invention

According to an aspect of the present invention, provided are a latent heat storage material that changes the phase within a prescribed temperature range, and a cold storage tool, a logistic packaging container, and a food cold storage tool each using the latent heat storage material, and a cooling method.

DESCRIPTION OF EMBODIMENTS

First Embodiment

Latent Heat Storage Material

Figure 1:
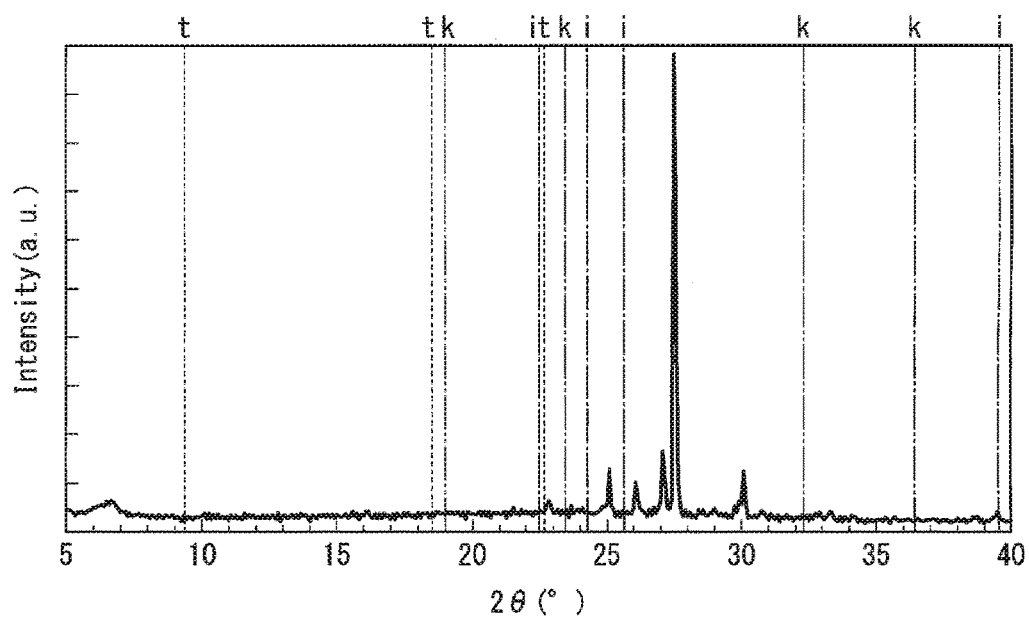
FIG. 1 is an X-ray diffraction pattern of a latent heat storage material of a first embodiment.

A latent heat storage material of an embodiment of the present invention will now be described.

The latent heat storage material of the present embodiment is used in a cold storage tool or a logistic packaging container including a cold storage tool described below.

The latent heat storage material of the present embodiment includes a tetrabutylammonium ion (hereinafter, TBA$^+$) and a bromide ion (hereinafter, Br$^-$) constituting tetrabutylammonium bromide (hereinafter, TBAB), a potassium ion (hereinafter, K$^+$) and a nitrate ion (hereinafter, NO$_3^-$) constituting potassium nitrate, and water.

Incidentally, in the present specification, the term "constituting" means that an ion can constitute a material. That is, the latent heat storage material of the present embodiment includes TBA$^+$ and Br$^-$ that can constitute TBAB, K$^+$ and NO$_3^-$ that can constitute potassium nitrate, and water. Accordingly, the raw materials of the latent heat storage material of the present embodiment are not limited to TBAB, potassium nitrate, and water. For example, the raw materials of the latent heat storage material of the present embodiment may be tetrabutylammonium nitrate, potassium bromide, and water.

TBAB is one of quaternary ammonium salts. The hydrate of a quaternary ammonium salt is a semi-clathrate hydrate in which the host compound (host molecule) is a water molecule and the guest compound (guest molecule) is a quaternary ammonium cation. It is known that a cation of an organic salt represented by a tetraalkylamine salt and a tetraalkylphosphine salt functions as a guest molecule of a semi-clathrate hydrate.

Here, the term "clathrate hydrate" refers to a compound that crystallizes in a state in which a guest molecule having a relatively small molecule size of a molecular weight of 200 or less, such as tetrahydrofuran and cyclohexane, is encapsulated within cavities of a cage-shaped clathrate lattice formed by hydrogen bonds of water molecules as the host molecule. In contrast, the term "semi-clathrate hydrate" refers to a compound that crystallizes in a state in which a guest molecule having a relatively large molecule size, such as a tetraalkylammonium cation is encapsulated within a cage-shaped clathrate lattice that is formed by hydrogen bonds of water molecules as the host molecule so as to avoid the alkyl chain of the tetraalkylammonium cation. In addition, since the cage-shaped clathrate lattice formed by hydrogen bonds in a semi-clathrate hydrate encapsulates a guest molecule having a relatively large size as described above, crystallization occurs in a partially broken state unlike a cage-shaped clathrate lattice formed by hydrogen bonds of water molecules in clathrate hydrate. Accordingly, it is called semi-clathrate hydrate.

In the description below, the term "clathrate hydrate" includes "semi-clathrate hydrate".

It is known that clathrate hydrates of quaternary ammonium salts are generated under normal pressure and generate heat during the generation. At the same time, it is known that clathrate hydrates of quaternary ammonium salts absorb heat when dissociated. The latent heat storage material of the present embodiment can use the heat amounts during the generation and the dissociation of the clathrate hydrate of a quaternary ammonium salt as the latent heat amount.

Tetradecane is known as a material having a melting point (melting temperature) within a prescribed temperature range. The clathrate hydrates of quaternary ammonium salts are not combustible materials, unlike tetradecane. Accordingly, handling of the clathrate hydrates of quaternary ammonium salts is easy.

In particular, among quaternary ammonium salts, since halide salts are primary products of a Menschutkin reaction of a tertiary amine and a halogenated alkane and can be easily synthesized, the manufacturing cost thereof is low compared to other anion salts. In addition, the Menschutkin reaction is a nucleophilic reaction, and the reaction easily proceeds in the order of alkane iodides, alkane bromides, and alkane chlorides. Accordingly, the synthesis is easy in the order of iodide salts, bromide salts, and chloride salts. However, for example, since an iodide salt of tetrabutylammonium, which is a typical quaternary ammonium salt, is poorly water soluble, it is difficult to form a clathrate hydrate. Consequently, a bromide salt of tetrabutylammonium (i.e., TBAB) is preferably used as a raw material of a clathrate hydrate. The latent heat storage material of the present embodiment can use a large amount of latent heat by using TBAB thus forming a clathrate hydrate.

The generation and the dissociation of a clathrate hydrate are similar to, for example, a phase change from a solid such as ice to a liquid such as water. Because of this reason, in the present specification, dissolution of a clathrate hydrate may be referred to as "melting".

In the present specification, the temperature at which a clathrate hydrate starts to melt is referred to as "melting start temperature".

In addition, the temperature at which the melting of a clathrate hydrate ends is referred to as "melting end temperature"

The intermediate temperature between the melting start temperature and the melting end temperature may be referred to as "melting temperature" or "melting point". The methods for measuring the melting start temperature, the melting end temperature, and the melting temperature will be described later.

The latent heat storage material of the present embodiment includes $TBA^+$ and $Br^-$ constituting TBAB, $K^+$ and $NO_3^-$ constituting potassium nitrate, and water. It is inferred that a material including such components forms a crystalline compound in the solid phase state and includes the formed crystalline compound. It is possible to confirm that the latent heat storage material of the present embodiment includes such a crystalline compound by observing a diffraction peak in X-ray diffraction (XRD) measurement of the latent heat storage material.

Incidentally, in the present specification, the XRD measurement uses an X-ray diffraction apparatus having a temperature control function. As the X-ray diffraction pattern of a latent heat storage material, an X-ray diffraction pattern of the latent heat storage material in the solid phase state obtained by solidifying the latent heat storage material using the temperature control function is used.

FIG. 1 is an X-ray diffraction pattern of a latent heat storage material according to a first embodiment. FIG. 1 shows diffraction angles 2θ of typical diffraction peaks of TBAB, potassium nitrate, and water as simple substances. Incidentally, the diffraction angle 2θ of each of the diffraction peaks is the value quoted from the Inorganic Crystal Structure Database (ICSD).

As shown in FIG. 1, the X-ray diffraction pattern of the latent heat storage material of the present embodiment is different from those of TBAB, potassium nitrate, and water as simple substances. Based on this result, it can be said that the latent heat storage material of the present embodiment is not a mixture composed of single crystals of these three molecules but includes a crystalline compound formed from $TBA^+$ and $Br^-$ constituting TBAB, $K^+$ and $NO_3^-$ constituting potassium nitrate, and water.

Figure 2:
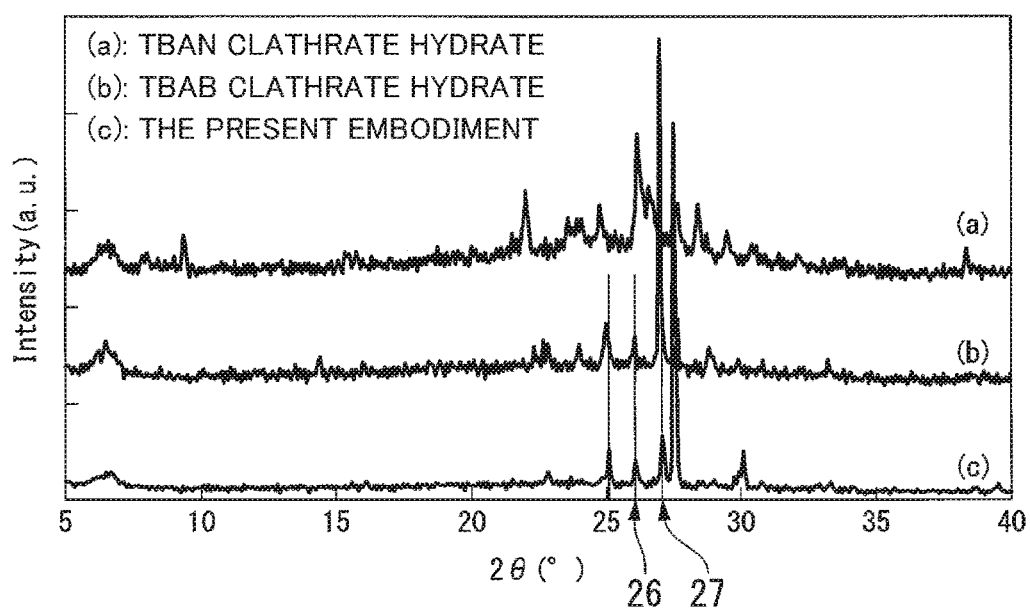
FIG. 2 is a graph comparing the X-ray diffraction pattern of a latent heat storage material of the first embodiment and X-ray diffraction patterns of other clathrate hydrates.

Furthermore, FIG. 2 is a graph comparing the X-ray diffraction pattern of a latent heat storage material of the first embodiment and X-ray diffraction patterns of other clathrate hydrates. FIG. 2 shows the clathrate hydrate of TBAB and the clathrate hydrate of tetrabutylammonium nitrate (hereinafter, TBAN) as other clathrate hydrates.

As shown in FIG. 2, in the latent heat storage material of the present embodiment and the clathrate hydrate of TBAB, diffraction peaks are observed at diffraction angles 2θ of 25°, 26°, and 27°. However, the X-ray diffraction pattern of the latent heat storage material of the present embodiment and the X-ray diffraction pattern of the clathrate hydrate of TBAB are partially different from each other. Accordingly, it is inferred that the latent heat storage material of the present embodiment is not a mixture of the clathrate hydrate of TBAB and a single crystal of potassium nitrate.

The present inventors expected that in the latent heat storage material of the present embodiment, TBAN is formed by ion exchange between $Br^-$ constituting TBAB and $NO_3^-$ constituting potassium nitrate. However, as shown in FIG. 2, the X-ray diffraction pattern of the latent heat storage material of the present embodiment and the X-ray diffraction pattern of the clathrate hydrate of TBAN are different from each other. Accordingly, it is inferred that the latent heat storage material of the present embodiment does not include the clathrate hydrate of TBAN.

From the above, it is inferred that the latent heat storage material of the present embodiment is a crystalline compound formed from $TBA^+$ and $Br^-$ constituting TBAB, $K^+$ and $NO_3^-$ constituting potassium nitrate, and water. As a result of earnest studies by the present inventors, it was demonstrated that the latent heat storage material includes such a crystalline compound and thereby has a melting start temperature of about 6° C. and a melting temperature of about 7° C.

In addition, $NO_3^-$ and $K^+$ constituting potassium nitrate are ions showing negative hydration. "Ion showing negative hydration" indicates an ion that acts such that the residence time of a water molecule coming into contact with the ion is shorter than the residence time of a water molecule at an equilibrium position in pure water. Water molecules around an ion showing negative hydration are in a disordered state. For this reason, an ion showing negative hydration is called a structural destruction ion. When a salt of an ion showing negative hydration, TBAB, and water are mixed at a specific composition ratio, the resulting crystalline compound has a melting point different from all of the melting points of the three molecules, the melting point of the eutectic crystal of TBAB clathrate hydrate and water, the melting point of the eutectic crystal of potassium nitrate and water, and the melting point of the eutectic crystal of potassium nitrate and TBAB.

In addition, it is possible to verify whether the latent heat storage material of the present embodiment includes $TBA^+$ and $Br^-$ constituting TBAB, $K^+$ and $NO_3^-$ constituting potassium nitrate, and water by a known method. Examples of such a method include methods by subjecting a latent heat storage material in a liquid phase state to liquid chromatography (LC), mass spectrometry (MS), or ion test paper. In addition, the examples include methods in which the water contained in the latent heat storage material of the present embodiment is evaporated with an evaporator or the like and the resulting solid content is then measured by X-ray photoelectron spectroscopy, infrared spectroscopy, or nuclear magnetic resonance method.

In the latent heat storage material of the present embodiment, the molar ratio of potassium nitrate to TBAB is 0.3 or more and 1.3 or less.

When the molar ratio of potassium nitrate to TBAB is less than 0.3, the proportion of the clathrate hydrate of TBAB accounting for the clathrate hydrates in the latent heat storage material of the present embodiment is increased. The clathrate hydrate of TBAB has a melting start temperature of about 12° C. Accordingly, when the molar ratio is less than 0.3, the latent heat amount per unit mass of the latent heat storage material within a target temperature range of higher than 5° C. and 10° C. or less is decreased.

When the molar ratio of potassium nitrate to TBAB is higher than 1.3, a part of the potassium nitrate cannot be dissolved in water and precipitates. Since the precipitated potassium nitrate does not function as a latent heat storage material within a temperature range of higher than 5° C. and 10° C. or less, as a result, the latent heat amount per unit mass of the latent heat storage material within a target temperature range is decreased.

The molar ratio of potassium nitrate to TBAB is preferably 0.5 or more and 0.8 or less and more preferably 0.6 or more and 0.8 or less.

In the latent heat storage material of the present embodiment, the molar ratio of water to TBAB is adjusted within a range that gives a congruent melting point of a clathrate hydrate formed by TBAB and water. Such a molar ratio of water to TBAB is 22 or more and 32 or less. Consequently, it is possible to obtain a latent heat storage material having a melting start temperature within a prescribed temperature range. In addition, the latent heat amount per unit mass of the resulting latent heat storage material is high.

In contrast, when the molar ratio of water to TBAB is less than 22, since the concentration of TBAB is relatively high, TBAB is apt to precipitate. Since the precipitated TBAB does not function as a latent heat storage material within a temperature range of higher than 5° C. and 10° C. or less, as a result, the latent heat amount per unit mass of the latent heat storage material within a target temperature range is decreased.

When the molar ratio of water to TBAB is higher than 32, since the amount of water is too high, a eutectic crystal of potassium nitrate and water is readily generated. Since the eutectic crystal of potassium nitrate and water has a melting point of about −3° C., the latent heat amount per unit mass of the latent heat storage material within a target temperature range of higher than 5° C. and 10° C. or less is decreased.

The molar ratio of water to TBAB is preferably 24 or more and 30 or less and more preferably 26 or more and 30 or less.

From the viewpoint of increasing the latent heat amount per unit mass of the resulting latent heat storage material, the molar ratio of potassium nitrate to TBAB is preferably 0.5 or more and 0.8 or less, and the molar ratio of water to TBAB is preferably 24 or more and 30 or less.

In general, since the raw material costs of potassium nitrate and water are lower than that of TBAB, from the viewpoint of reducing the manufacturing cost of the latent heat storage material, the molar ratio of potassium nitrate to TBAB is preferably 0.6 or more and 1.3 or less, and the molar ratio of water to TBAB is preferably 26 or more and 32 or less.

From the viewpoint of increasing the latent heat amount per unit mass of the resulting latent heat storage material and reducing the manufacturing cost of the latent heat storage material, the molar ratio of potassium nitrate to TBAB is preferably 0.6 or more and 0.8 or less, and the molar ratio of water to TBAB is preferably 26 or more and 30 or less.

The latent heat storage material of the present embodiment may include, in addition to the above-mentioned materials, an additive within a range that does not impair the effects of the present invention.

For example, the latent heat storage material of the present embodiment may include a thickener for adjusting the viscosity of the latent heat storage material for ease of handling. Examples of the thickener include xanthan gum, guar gum, carboxymethyl cellulose, and sodium polyacrylate.

In addition, the latent heat storage material of the present embodiment may include a supercooling prevention agent for the purpose of regulating the supercooling of the latent heat storage material. In addition, for the purpose of using for long time, the latent heat storage material may include an antibacterial agent. Incidentally, the additives that can be used in the present invention are not limited to the materials exemplified above.

The latent heat storage material of the present embodiment has a melting start temperature of higher than 5° C. and 10° C. or less. It is said that the melting start temperature of a clathrate hydrate of TBAB is about 12° C. Based on this, the melting start temperature of the latent heat storage material of the present embodiment is lower than that of the clathrate hydrate of TBAB.

In the present specification, as the melting start temperature and the melting temperature of the latent heat storage material, the values obtained by the following methods are employed.

First, about 5 g of a latent heat storage material is weighed and is poured in a glass tube bottle. The temperature of the central portion of the latent heat storage material in the glass tube bottle is measured with a thermocouple, and the glass tube bottle is accommodated in a thermostat having a temperature adjustment function under room temperature. Secondly, the temperature inside the thermostat is cooled down to −20° C. to freeze the latent heat storage material, and the temperature is raised from −20° C. to 30° C. at a rate of 0.25° C./min. On this occasion, the time at which the temperature starts to rise is defined as 0 hour, and a graph of change in temperature of the latent heat storage material with respect to the temperature rising time is obtained. This change in temperature may be referred to as melting behavior.

In the resulting graph of melting behavior, the temperature of the latent heat storage material is differentiated by the temperature rising time, and the temperature of the latent heat storage material at the time giving a differential value of zero earliest during the measurement time is employed as the melting start temperature.

As the melting end temperature, the temperature of the latent heat storage material at the time giving a differential value of zero latest during the measurement time is employed.

The melting temperature is the intermediate temperature between the melting start temperature and the melting end temperature.

The latent heat amount per unit mass of the latent heat storage material is the value obtained by differential scanning calorimetry (DSC). Specifically, about 4 mg of a latent heat storage material in a liquid phase state is enclosed in an aluminum pan for DSC measurement. The temperature of the enclosed latent heat storage material is lowered at a rate of 5° C./min to change the phase from the liquid phase state to the solid phase state, and the temperature is then raised at a rate of 5° C./min. An endothermic peak appears in the DSC curve when the phase changes from the solid phase state to the liquid phase state by increasing the temperature of the latent heat storage material. The value obtained by dividing the area of the endothermic peak by the mass of the sample is defined as the latent heat amount per unit mass.

From the above, the latent heat storage material of the present embodiment changes the phase within a prescribed temperature range.

Method for Manufacturing Latent Heat Storage Material

The latent heat storage material of the present embodiment is obtained by mixing TBAB, potassium nitrate, and water in a prescribed ratio. As described above, potassium nitrate is used at a molar ratio of 0.3 or more and 1.3 or less with respect to TBAB. Water is used at a molar ratio of 22 or more and 32 or less with respect to TBAB. Although the order of mixing these materials is not particular limited, a latent heat storage material is obtained by adding potassium nitrate and water in this order to TBAB and stirring well until the insoluble matter disappears. In addition, an aqueous solution of TBAB and an aqueous solution of potassium nitrate are prepared in advance, and they may be mixed.

Second Embodiment

Cold Storage Tool

A cold storage tool using the above-described latent heat storage material will now be described based on FIGS. 3 and 4.

Incidentally, in the drawings used in the following description, characteristic parts may be enlarged for convenience for the purpose of emphasizing the characteristic parts, and the dimensional ratios of the respective components may not be the same as the actual ones. In addition, for the same purpose, parts that are not characteristic may be omitted in the drawings.

The cold storage tool of the present embodiment cools an object to be kept cold. Examples of the object to be kept cold include food, medicine, and human bodies. Examples of the food include greengrocery such as vegetables and fruits, dairy products such as milk, processed foods such as ham, and beverages such as wine and champagne. In addition, the cold storage tool of the present embodiment may cool a closed space such as a refrigerator and a packing container or an open space for the purpose of, for example, air conditioning.

In the case of greengrocery, the storage temperature is said to be higher than 0° C. and 15° C. or less. In contrast, in the case of refrigerated products including dairy products such as milk and processed foods such as ham, the storage temperature is said to be higher than 0° C. and 10° C. or less. In the case of medicine, the storage temperature is said to be 2° C. or more and 8° C. or less.

Figure 3:
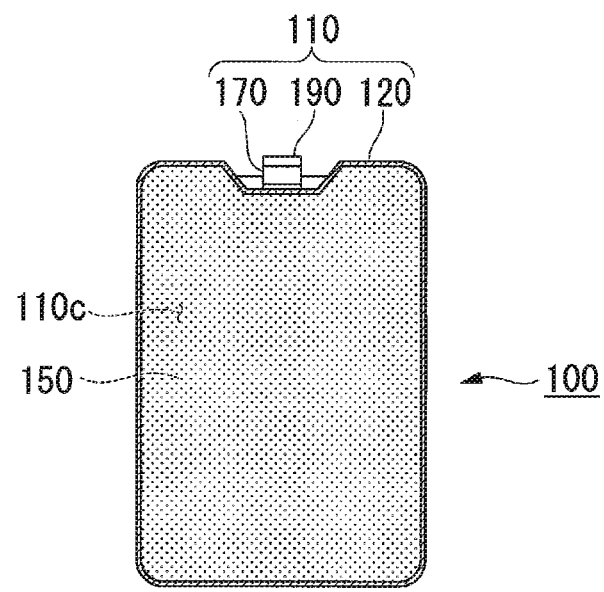
FIG. 3 is a plan view of a cold storage tool 100 of a second embodiment.
Figure 4:
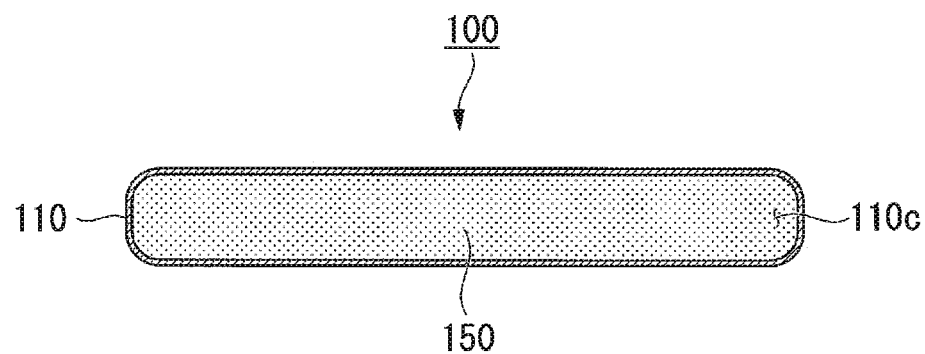
FIG. 4 is a cross-sectional view of the cold storage tool 100 shown in FIG. 3.

FIG. 3 is a plan view of a cold storage tool 100 of a second embodiment. FIG. 4 is a cross-sectional view of FIG. 3. As shown in FIGS. 3 and 4, the cold storage tool 100 includes a cold storage tool body 110 and a latent heat storage material 150. The cold storage tool 100 of the present embodiment is a so-called blow container type cold storage tool obtained by a method of injecting a latent heat storage material using a cylinder pump described later.

In the cold storage tool body 110, a latent heat storage material 150 is accommodated in an interior space 110c in a liquid-tight state.

The cold storage tool body 110 includes an accommodation member 120, an inlet 170, and a sealing member 190.

The accommodation member 120 is a member having a hollow structure. The accommodation member 120 is preferably made of a material having high rigidity. Consequently, in the phase change of the latent heat storage material 150 from the solid phase to the liquid phase, the accommodation member 120 is hardly deformed. Examples of such a material include resin materials, such as polyethylene, polypropylene, polyester, polyurethane, polycarbonate, polyvinyl chloride, and polyamide; metals, such as aluminum, stainless steel, copper, and silver; and inorganic materials, such as glass, china, and ceramic. The accommodation member 120 is preferably molded from a resin material from the viewpoint of ease of formation and durability of the accommodation member 120.

The accommodation member 120 may be wrapped with a film of, for example, polyethylene, polypropylene, polyester, polyurethane, polycarbonate, polyvinyl chloride, or polyamide. In order to enhance the durability and the barrier property of the film, a thin film of aluminum or silicon dioxide is preferably formed on the film. Furthermore, it is preferable to attach a sticker of a temperature indicating material to the accommodation member 120 because the temperature of the cold storage tool can be judged.

The inlet 170 in FIG. 3 is disposed in the upper portion of the accommodation member 120. In the method described later, the latent heat storage material 150 is injected to the inside of the accommodation member 120 from the inlet 170.

The inlet 170 is sealed by a sealing member 190.

The cold storage tool 100 of the present embodiment is brought near or into contact with an article (object to be kept cold), and it is thereby possible to control the temperature of the article or cool the article at a temperature near the melting start temperature of the latent heat storage material of the present invention.

Method for Manufacturing Cold Storage Tool

Figure 5:
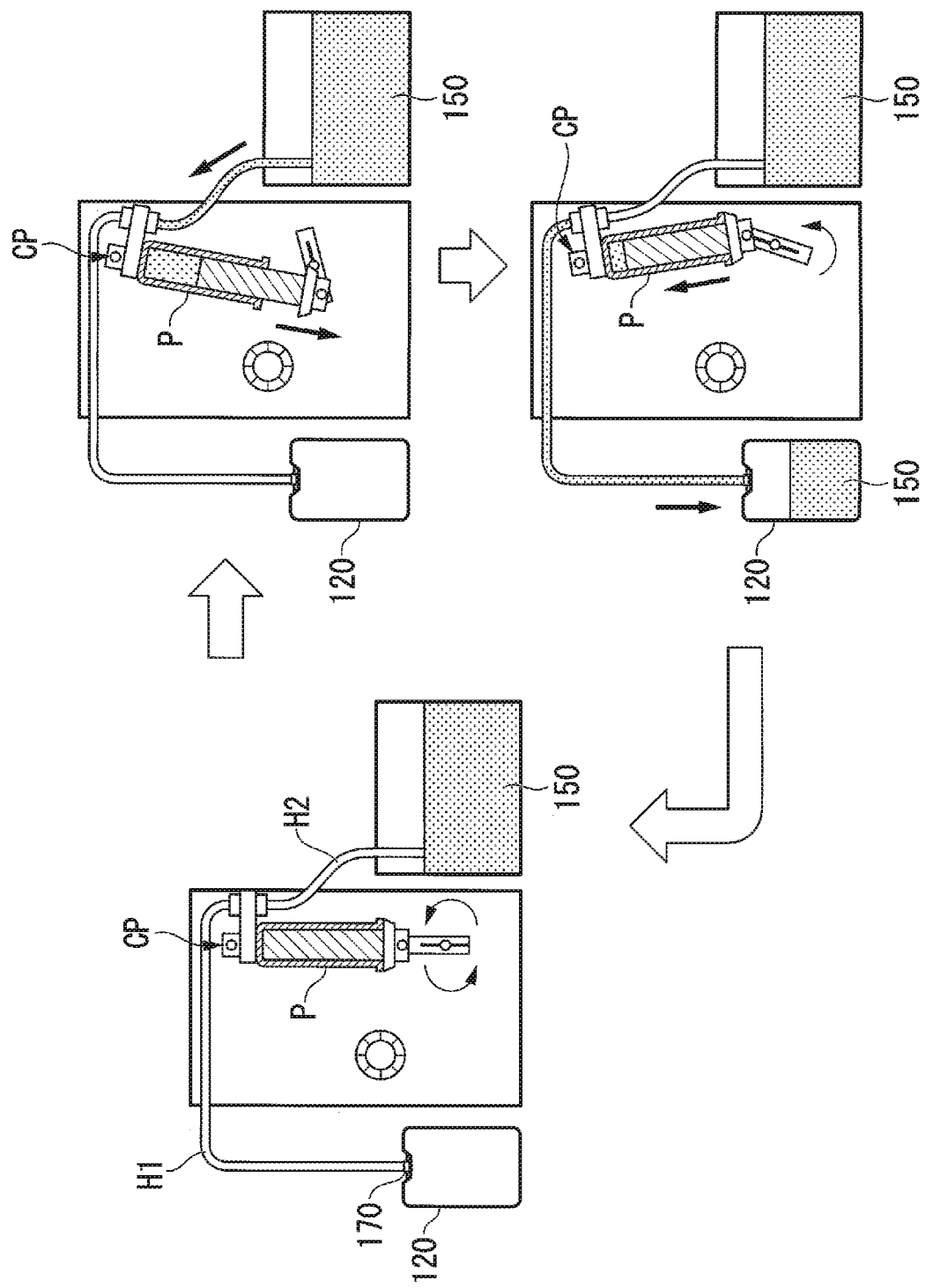
FIG. 5 is a conceptual diagram illustrating a process of manufacturing the cold storage tool 100 of the second embodiment.

An example of the method for manufacturing the cold storage tool 100 of the present embodiment will be described. FIG. 5 is a conceptual diagram illustrating a process of manufacturing the cold storage tool 100 of the second embodiment.

As shown in FIG. 5, the latent heat storage material 150 is injected to the accommodation member 120 through the inlet 170 using a cylinder pump CP. Incidentally, the method for injecting the latent heat storage material 150 is not limited thereto, and the method may be an injection method using a mohnopump.

Specifically, first, a filling hose H1 of a cylinder pump CP is set to the inlet 170 of an accommodation member 120, and a suction hose H2 is set to a container containing a latent heat storage material 150.

Secondly, the latent heat storage material 150 is sucked up by descending the piston P of the cylinder pump CP. Then, the inside of the piston P is filled with the latent heat storage material 150, and the latent heat storage material 150 is injected to the accommodation member 120 by raising the piston P.

The amount of the latent heat storage material 150 to be injected is not particularly limited and is preferably 70% or more and 90% or less of the inner volume of the accommodation member 120.

Further, the inlet 170 is sealed with a sealing member 190. As the sealing method using the sealing member 190, there are a method of stoppering by a known process such as ultrasonic welding or thermal welding and a method using the sealing member 190 of a screw plug that can be opened with a hand. Stoppering by, for example, ultrasonic welding or thermal welding is preferred because it does not have a risk of leakage of the latent heat storage material 150, etc.

Finally, the cold storage tool 100 is left to stand in a temperature environment not higher than the solidification temperature of the latent heat storage material 150 to solidify the latent heat storage material 150. Through such a process, the cold storage tool 100 of the present embodiment is manufactured.

Incidentally, as described here, although the latent heat storage material 150 may be solidified before the cold storage tool 100 is mounted on a logistic packaging container described later, when the temperature environment of the logistic packaging container can be controlled to a temperature not higher than the solidification temperature of the latent heat storage material 150 in the first step of the physical distribution process, it is possible to start using the latent heat storage material 150, even if it is in the liquid phase state, in the cold storage tool 100.

As described above, the melting start temperature and the melting temperature of the latent heat storage material of the present embodiment are higher than 5° C. and 10° C. or less.

Accordingly, the cold storage tool 100 using the latent heat storage material of the present embodiment can be used for cooling greengrocery, refrigerated products, and medicine that are preferably cooled within a temperature range of higher than 5° C. and less than 10° C.

In general, in transportation of foods, various foods are collected from the producers, sorted for each customer, and then accommodated in a logistic packaging container cooled down with a cold insulator and delivered. During such a process, the foods may be temporarily stored together with the logistic packaging container in a refrigerating room (warehouse) whose temperature is electrically controlled at 3° to 5° C.

Here, when the cold insulator used in a cold storage tool is a conventional material, such as ice having a melting temperature of 0° C., the cold insulator melts during the storage in the refrigerating room of 3° C. to 5° C. In such a case, when the logistic packing container is taken out from the refrigerating room and the delivery is restarted, the cold insulator has melted and does not function. Accordingly, when foods are delivered using a conventional cold insulator, it is necessary to separately store the cold insulator at a temperature lower than the melting start temperature of the cold insulator or replace the cold insulator with another cold in a sold phase state during the foods are stored in the refrigerating room or before the delivery is restarted.

In contrast, since the latent heat storage material of the cold storage tool 100 of the present embodiment has a melting start temperature of higher than 5° C., even if it is stored in a refrigerating room of 3° C. to 5° C., the latent heat storage material does not melt or solidifies. Accordingly, when the logistic packing container is taken out from the refrigerating room and the delivery is restarted, for example, replacement of the cold storage tool 100 is unnecessary. Accordingly, the cold storage tool 100 of the present embodiment can easily maintain the cold insulation performance of the cold storage tool 100 during the period from the collection of foods until the end of delivery.

Logistic Packaging Container

A logistic packaging container using the cold storage tool 100 of the second embodiment will now be described based on FIG. 6.

Figure 6:
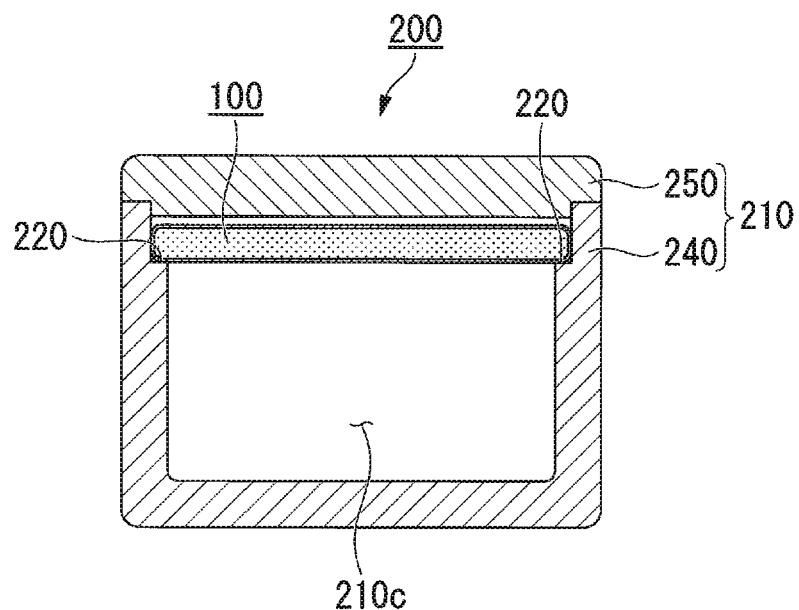
FIG. 6 is a cross-sectional view of a logistic packaging container 200 of the second embodiment.

FIG. 6 is a cross-sectional view of a logistic packaging container 200 of the second embodiment. The logistic packaging container 200 includes a logistic packaging container body 210 and a cold storage tool 100.

The logistic packaging container body 210 is a container having a size that can be carried by a person. The logistic packaging container body 210 is composed of a wall portion 240 and a lid portion 250.

The wall portion 240 has an opening for putting in and taking out an article and the cold storage tool 100. The wall portion 240 includes a cold storage tool holding portion 220 for holding the cold storage tool 100. The cold storage tool holding portion 220 is formed by cutting off the upper end of the wall portion 240 constituting the side face of the logistic packaging container body 210. The cold storage tool holding portion 220 is formed on the upper ends of the wall portion 240 facing each other. Incidentally, the cold storage tool holding portion 220 may be formed on the upper end of the wall portion 240 over the whole circumference of the wall portion 240.

The cold storage tool holding portion 220 is disposed inside the logistic packaging container body 210. The logistic packaging container 200 is used by placing the cold storage tool 100 on the cold storage tool holding portion 220. Consequently, the temperature inside the logistic packaging container body 210 is maintained at about the melting point of the latent heat storage material of the cold storage tool 100. The cold storage tool holding portion 220 may have a structure capable of fixing the cold storage tool 100.

The wall portion 240 is preferably formed by a material having a heat insulating property, such as styrene foam, urethane foam, and a vacuum insulation material. An insulating layer formed by a material having a heat insulating property may be disposed on the inside or the outside of the body formed by a material without considering a heat insulating property.

The lid portion 250 closes the wall portion 240 that is open. The lid portion 250 is formed by a material mentioned as materials forming the wall portion 240. The lid portion 250 may be formed by the same material as or a different material from that of the wall portion 240.

The wall portion 240 and the lid portion 250 may be connected to each other or may be separated from each other. The lid portion 250 preferably has a structure adhering to the wall portion 240 for reducing the heat input to and output from the logistic packaging container 200.

The logistic packaging container body 210 has an interior space 210c capable of accommodating an article. The interior space 210c is a region surrounded by the wall portion 240 and the lid portion 250.

When an article is accommodated in the interior space 210c of the logistic packaging container body 210, the article is maintained at a temperature near the melting temperature of the latent heat storage material.

Modification

Figure 7:
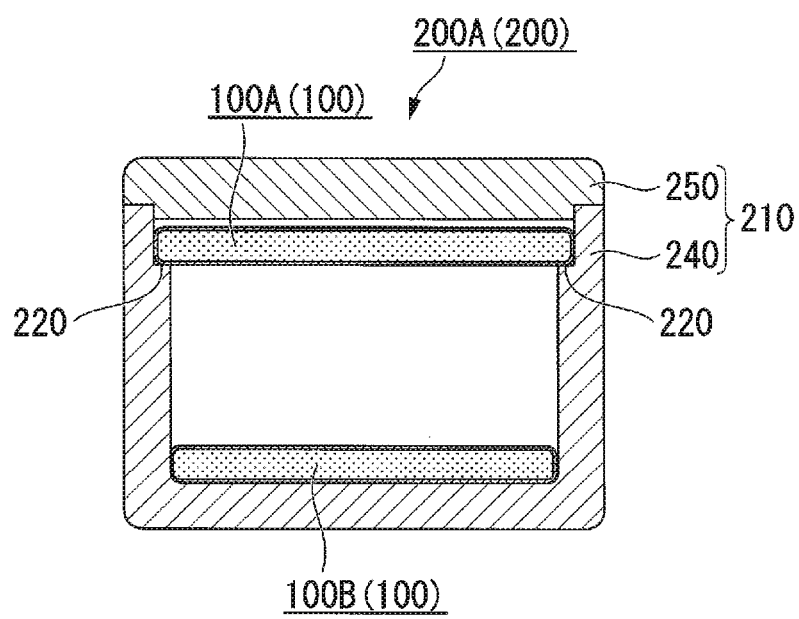
FIG. 7 is a cross-sectional view showing a modification 200A of the logistic packaging container of the second embodiment.

FIG. 7 is a cross-sectional view showing a modification 200A of the logistic packaging container of the second embodiment. As shown in FIG. 7, the logistic packaging container 200A includes two cold storage tools 100. In the logistic packaging container 200A, the two cold storage tools 100 face each other. One cold storage tool 100A is held by a cold storage tool holding portion 220. That is, In the logistic packaging container 200A, a part of the wall portion 240 functions as the holding member. The other cold storage tool 100B is disposed on the bottom face inside the logistic packaging container body 210. Consequently, it is possible to prevent heat inflow from the bottom face 210a to the object X to be kept cold.

In addition, the cold storage tool 100 has little shape change in the phase change of the latent heat storage material from the solid phase to the liquid phase. Accordingly, in the logistic packaging container 200A, an object X to be kept cold can be stably held.

Here, there are three methods for transferring heat from a substance to another substance, i.e., convection, thermal conduction, and thermal radiation. Among them, it is inferred that thermal conduction has the least heat loss.

In the logistic packaging container 200A, the cold storage tool 100B is disposed at the position described above, and thereby an object X to be kept cold can be brought into contact with the cold storage tool 100B in the inside of the logistic packaging container body 210. It is inferred that when an object X to be kept cold and the cold storage tool 100B are brought into contact with each other, thermal conduction occurs between the object X to be kept cold and the cold storage tool 100B, and the object X to be kept cold is cooled down. In this case, there is almost no influence by heat inflow from the outside into the logistic packaging container 200A.

In contrast, when the cold storage tool 100 and an object X to be kept cold are separated from each other as in the logistic packaging container 200 shown in FIG. 6, it is inferred that heat convection occurs between the cold storage tool 100 and the object X to be kept cold to cool down the object X to be kept cold. This case is easily influenced by heat inflow from the outside into the logistic packaging container 200, and it is difficult to cool at a temperature extremely close to the melting temperature of the latent heat storage material.

Accordingly, the logistic packaging container 200A is less influenced by heat inflow compared to the logistic packaging container 200 and can easily control the temperature of an object X to be kept cold at a temperature near the melting temperature of the latent heat storage material.

When the object to be kept cold is greengrocery, if the storage temperature is too low, so-called low temperature damage, such as discoloring to black, may occur. In contract, in the logistic packaging container 200A, since the melting start temperature of the latent heat storage material provided to the cold storage tool 100B is higher than 5° C., low temperature damage hardly occurs.

Incidentally, the latent heat storage materials of the cold storage tool 100A and the cold storage tool 100B may be the same or different.

Figure 8:
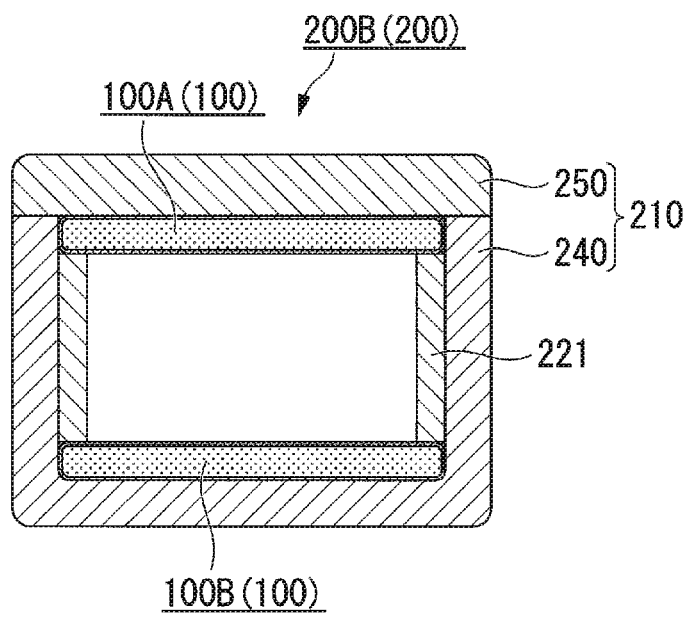
FIG. 8 is a cross-sectional view showing a modification 200B of the logistic packaging container of the second embodiment.

FIG. 8 is a cross-sectional view showing a modification 200B of the logistic packaging container of the second embodiment. The logistic packaging container 200B is different from the logistic packaging container 200A of FIG. 7 in that a cold storage tool holding member 221 is disposed on the side surface inside the logistic packaging container body 210. One cold storage tool 100A is held by the cold storage tool holding member 221. The other cold storage tool 100B is disposed on the bottom face inside the logistic packaging container body 210.

As in the logistic packaging container 200A of FIG. 7, the logistic packaging container 200B can easily control the temperature of an object to be kept cold compared to the logistic packaging container 200.

The logistic packaging container body of an aspect of the present invention may be a huge container such as a stowage. In addition, the logistic packaging container of an aspect of the present invention may be a container provided with a cooling system, such as a reefer container.

Figure 9:
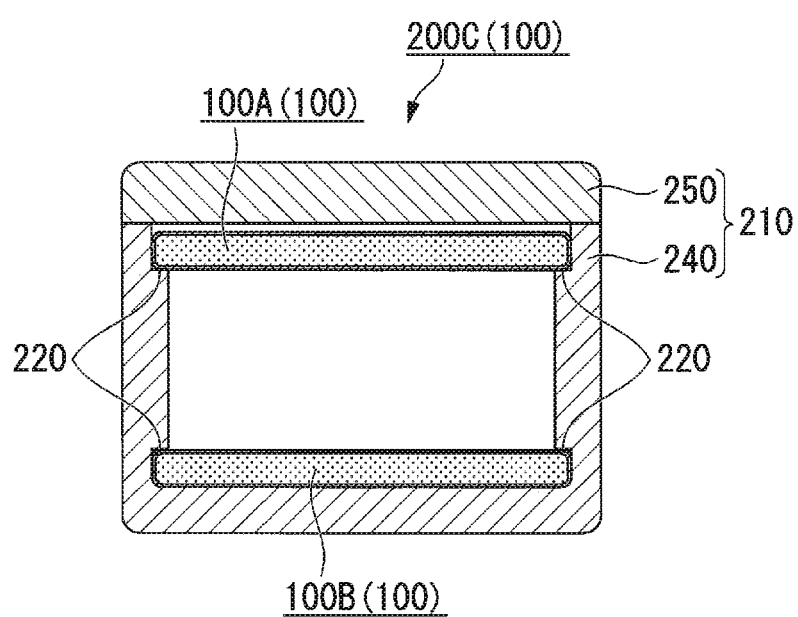
FIG. 9 is a cross-sectional view showing a modification 200C of the logistic packaging container of the second embodiment.

FIG. 9 is a cross-sectional view showing a modification 200C of the logistic packaging container of the second embodiment. It is different from the logistic packaging container 200A of FIG. 7 in that the cold storage tool holding portion 220 of the logistic packaging container 200C is formed by cutting off the upper end and the lower end of the wall portion constituting the side surface of the logistic packaging container body. Consequently, the positions of two cold storage tools 100 are stabilized, even if the logistic packaging container 200C of the present embodiment is used in a tilted posture.

As in the logistic packaging container 200A of FIG. 6, the logistic packaging container 200C can easily control the temperature of an object to be kept cold compared to the logistic packaging container 200.

The number of the cold storage tools provided to the logistic packaging container of an aspect of the present invention is not particularly limited and may be three or more.

In the logistic packaging container of an aspect of the present invention, the cold storage tool may be built in the logistic packaging container body. Alternatively, the cold storage tool itself may be a logistic packaging container.

In the logistic packaging container of an aspect of the present invention, the lid portion may include a cold storage tool holding portion.

Since the logistic packaging container 200 of the second embodiment includes the above-described cold storage tool 100, it can be used also for cooling greengrocery and refrigerated products and also for cooling medicine.

Third Embodiment

Cold Storage Tool

A cold storage tool using the above-described latent heat storage material will now be described based on FIGS. 10 and 11.

Figure 10:
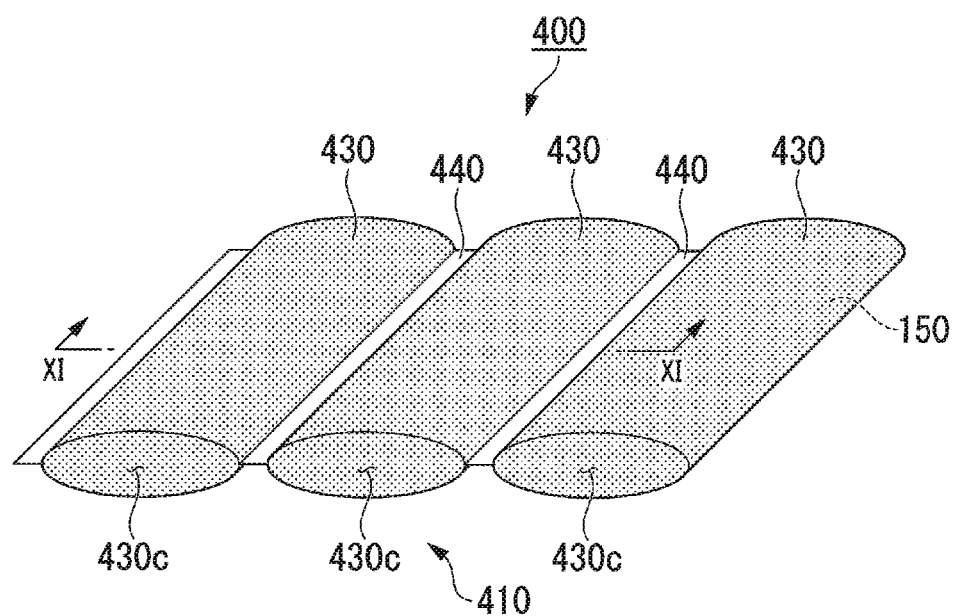
FIG. 10 is a perspective view showing a cold storage tool 400 of a third embodiment.

FIG. 10 is a perspective view showing a cold storage tool 400 according to a third embodiment. FIG. 11 is a cross-sectional view taken along the line XI-XI of FIG. 10. As shown in FIGS. 10 and 11, the cold storage tool 400 of the present embodiment includes a latent heat storage material 150 and a cold storage tool body 410. The cold storage tool 400 is a so-called film pack type cold storage tool. Accordingly, components in the present embodiment common to those in the second embodiment are designated by the same reference numerals, and detailed description thereof will be omitted.

The cold storage tool body 410 includes a plurality of accommodation portions 430 and a plurality of joints 440.

The accommodation portions 430 accommodate the latent heat storage material 150 in each interior space 430c in a liquid-tight state.

The accommodation portions 430 are each formed in a strip form. In FIG. 11, although the accommodation portions 430 each have a cross-section in an elliptical contour shape, the cross-section may be in another shape.

Figure 11:
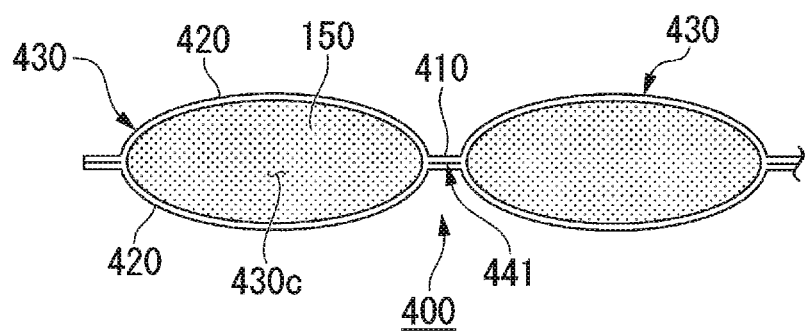
FIG. 11 is a cross-sectional view along the line XI-XI of FIG. 10.

Incidentally, although the number of the accommodation portions 430 in FIGS. 10 and 11 is three, the number is not limited thereto. The size of the cold storage tool 400 can be changed according to the size of an object to be kept cold by changing the number of the accommodation portions 430.

The joint 440 connects two accommodation portions 430 with each other and also has a joint function. The cold storage tool 400 has a plurality of joints 440 and thereby can come into contact with an object to be cooled down (object to be kept cold) in a posture along the shape of the object to be kept cold even if the latent heat storage material 150 is in a solid phase state. Accordingly, even if the object to be kept cold has a complicated shape, the cold storage tool 400 can effectively cool down the object to be cooled.

As shown in FIG. 11, the cold storage tool body 410 is constituted of film members 420. The film members 420 are joined to each other with a plurality of joining portions 441. The region of the film member 420 overlapping with the joining portion 441 in a planar view functions as the joint 440. The region of the film member 420 not overlapping with the plurality of joining portions 441 in a planar view functions as the accommodation portion 430.

The film member 420 is preferably formed by a material that can prevent leakage and volatilization of the latent heat storage material 150. In addition, the film member 420 is preferably formed by a material that can join the film members 420 to each other in the manufacturing method described later. Furthermore, the film member 420 is preferably formed by a material having softness that imparts a joint function to the joint 440.

From these viewpoints, the material for forming the film member 420 is preferably, for example, polyethylene, polypropylene, polyamide, or polyester. The film member 420 may be formed by a single material or by an arbitrary combination of two or more materials. In addition, the film member 420 may be constituted of a single layer or multiple layers.

The film member 420 is preferably constituted of a multilayer film composed of a low-density polyethylene resin layer and a polyamide resin layer. In this case, the joint 440 can be formed by stacking two multilayer films such that the low-density polyethylene resin layers face each other and thermocompression-bonding the contact surfaces of the low-density polyethylene resin layers to each other.

In order to enhance the durability and the barrier property of the film member 420, the film member 420 preferably includes a thin film of aluminum or silicon dioxide. Furthermore, it is preferable to attach a sticker of a temperature indicating material to the film member 420 because the temperature of the cold storage tool 400 can be judged.

In addition, for the purpose of increasing the physical strength, improving the touch, and increasing the heat insulating property of the cold storage tool 400, the film member 420 may have a so-called pack-in-pack structure in which the outside of the film member 420 is further wrapped with a film.

The cold storage tool 400 may be attached to a fixing jig for fixing an object to be kept cold and may be fixed to the object to be kept cold. Examples of the fixing jig include a supporter, a towel, and a bandage.

The cold storage tool 400 of the third embodiment can be used also for cooling greengrocery and refrigerated products and also for cooling medicine as in the cold storage tool 100 of the second embodiment.

Method for Manufacturing Cold Storage Tool

Figure 12:
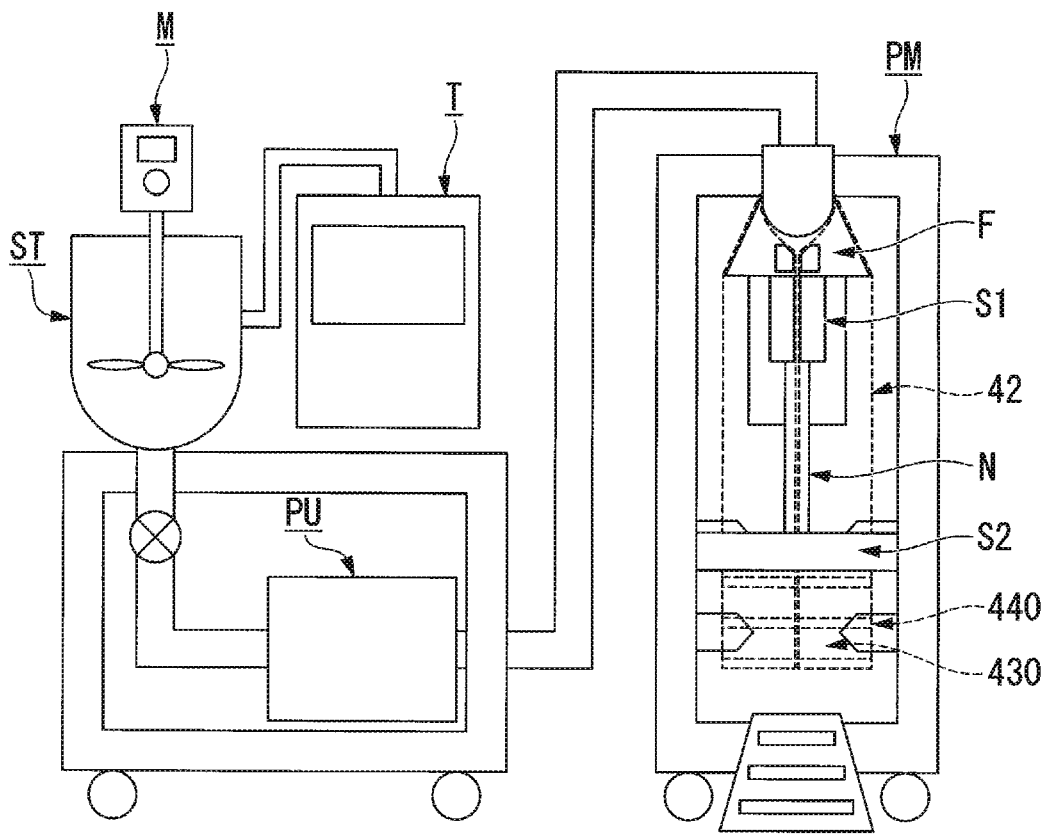
FIG. 12 is a diagram illustrating a schematic configuration of an apparatus that is used for manufacturing the cold storage tool 400 of the third embodiment.

An example of the method for manufacturing the cold storage tool 400 of the present embodiment will be described. FIG. 12 is a diagram illustrating a schematic configuration of an apparatus that is used for manufacturing a cold storage tool 400 according to the third embodiment. The manufacturing apparatus shown in FIG. 12 is a so-called vertical pillow packing machine, which is used for packing foods.

First, a latent heat storage material 150 stored in a thermostat T is transported to a stirring tank ST and is stirred using a stirrer M. Secondly, a rolled film (not shown) is fed out, and both ends of the film 42 in the long axis direction are aligned with each other in the former portion F of the packing machine PM. Then, the both ends are attached to form a tubular shape by thermocompression bonding by a vertical sealing part S. Then, the short axis direction of the tubular film 42 is thermocompression-bonded by a horizontal sealing part S2. Then, the pump PU is operated to inject the latent heat storage material 150 into the tubular film 42 through a nozzle N, and the short axis direction of the tubular film 42 is then thermocompression-bonded again by the horizontal sealing part S2 to form a joint 440 and an accommodation portion 430. Consequently, a cold storage tool 400 can be manufactured.

Logistic Packaging Container

A logistic packaging container using the cold storage tool 400 of the third embodiment will now be described based on FIG. 13.

Figure 13:
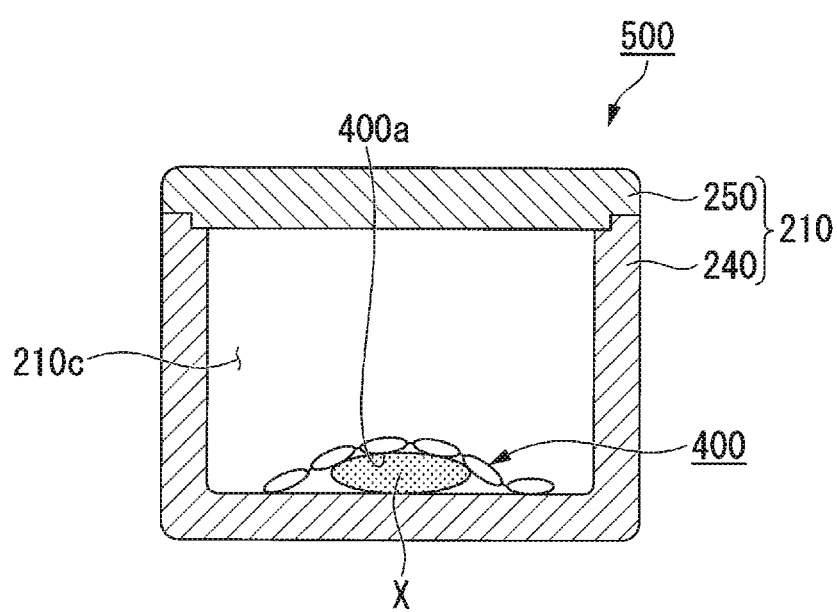
FIG. 13 is a cross-sectional view showing a logistic packaging container 500 of the third embodiment.

FIG. 13 is a cross-sectional view showing a logistic packaging container 500 of the third embodiment. As shown in FIG. 13, the logistic packaging container 500 includes a logistic packaging container body 210 and a cold storage tool 400. Accordingly, components in the present embodiment common to those in the second embodiment are designated by the same reference numerals, and detailed description thereof will be omitted.

The logistic packaging container 500 covers an object X to be kept cold from the top using the cold storage tool 400. Consequently, the logistic packaging container 500 can bring at least a part of the cold storage tool 400 into contact with the object X to be kept cold in the inside of the logistic packaging container body 210. It is inferred that, on this occasion, thermal conduction occurs in the contact surfaces 400a of the object X to be kept cold and the cold storage tool 400 to cool down the object X to be kept cold. In this case, there is almost no influence by heat inflow from the outside into the logistic packaging container 500. Accordingly, the logistic packaging container 500 can efficiently cool the object X to be kept cold.

In contrast, as in the logistic packaging container 200 (see FIG. 6) of the second embodiment, when an object to be kept cold is cooled in a state in which the object to be kept cold and the cold storage tool are separated from each other, the cold storage temperature of the object to be kept cold is higher than the melting start temperature of the latent heat storage material provided to the cold storage tool due to heat exchange with the air present in the interior space of the logistic packaging container body. Accordingly, as the latent heat storage material, a material having a melting start temperature that is lower than the lower limit of the temperature range for maintaining the object to be kept cold is used. However, if such a latent heat storage material is applied to the cold storage tool 400, the temperature of the object to be kept cold may fall below the lower limit of the temperature range to be maintained.

In contrast, the logistic packaging container 500 of the present embodiment can cool an object X to be kept cold at about 7° C., which is the melting temperature of the latent heat storage material of the cold storage tool 400. As a result of earnest studies by the present inventors, it was demonstrated that an object X to be kept cold can be cooled within a range of 6° C. to 8° C. Accordingly, the logistic packaging container 500 is suitable for cooling and transporting medicine that requires strict temperature control and for cooling and transporting greengrocery that is apt to cause low temperature damage.

Incidentally, the logistic packaging container 500 may include a thermal insulation member in the upper portion of the cold storage tool 400 for enhancing the performance of cooling an object X to be kept cold.

It is preferable to appropriately adjust the shape, number, posture in use, and so on of the cold storage tool 400 according to the shape and properties of the object X to be kept cold.

Modification

Figure 14:
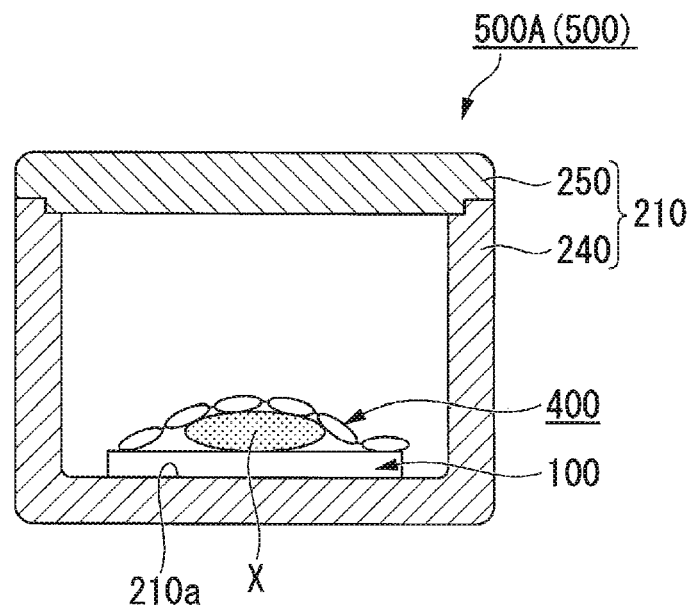
FIG. 14 is a cross-sectional view showing a modification 500A of the logistic packaging container of the third embodiment.

FIG. 14 is a cross-sectional view showing a modification 500A of the logistic packaging container of the third embodiment. The logistic packaging container 500A is different from the logistic packaging container 500 of FIG. 13 in that the logistic packaging container 500A includes a cold storage tool 400 and a cold storage tool 100 (see FIG. 4) of the second embodiment. In the logistic packaging container 500A, the cold storage tool 100 is disposed between an object X to be kept cold and the bottom face 210a inside the logistic packaging container body 210. Consequently, it is possible to prevent heat inflow from the bottom face 210a to the object X to be kept cold.

In addition, as described above, the cold storage tool 100 has little shape change at the phase change of the latent heat storage material from the solid phase to the liquid phase. Accordingly, in the logistic packaging container 500A, an object X to be kept cold can be stably held.

Since the logistic packaging container 500 of the third embodiment includes the above-described cold storage tool 400, it can be used also for cooling greengrocery and refrigerated products and also for cooling medicine.

Cooling Method

A method for using the logistic packaging container 500 of the third embodiment will be described with reference to FIGS. 15 to 19.

Figure 15:
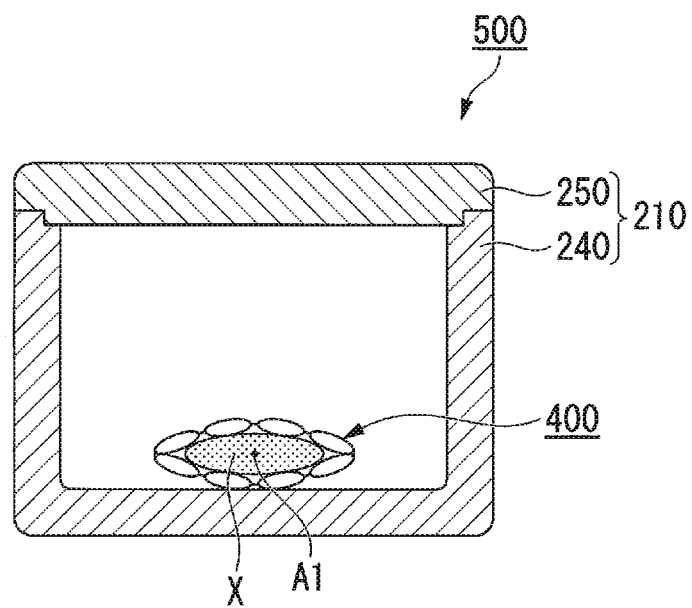
FIG. 15 is a conceptual diagram illustrating a method for using the logistic packaging container 500 of the third embodiment.

FIG. 15 is a conceptual diagram illustrating a method for using the logistic packaging container 500 of the third embodiment. Here, an axis A1 that penetrates the object X to be kept cold is assumed. In the present embodiment, the axis A1 corresponds to the "first axis". In the logistic packaging container 500, the object X to be kept cold may be surrounded by the cold storage tool 400 along a circumferential direction of the axis A1. Consequently, the object X to be kept cold can be cooled from the bottom face side and also the side face side inside the logistic packaging container body 210.

Figure 16:
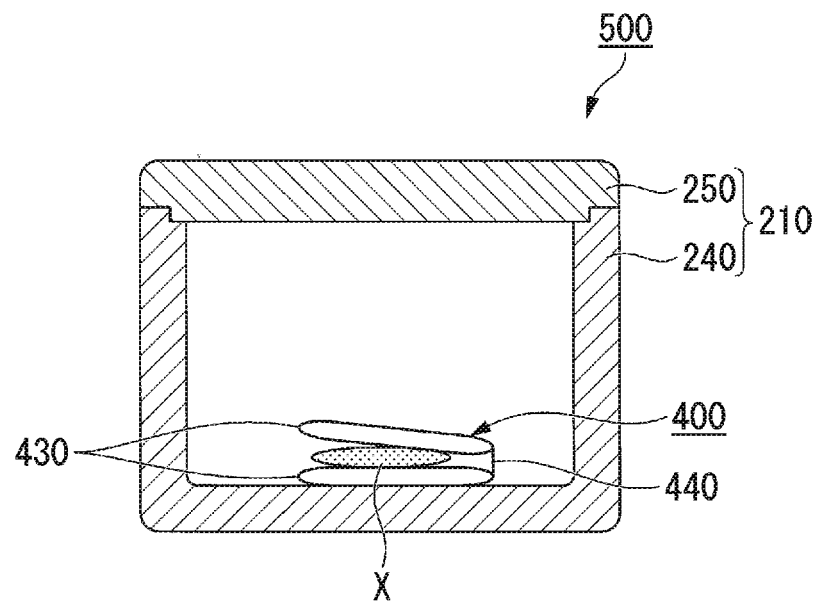
FIG. 16 is a conceptual diagram illustrating a method for using the logistic packaging container 500 of the third embodiment.

FIG. 16 is a conceptual diagram illustrating a method for using the logistic packaging container 500 of the third embodiment. FIG. 16 shows a logistic packaging container 500 including a cold storage tool 400 composed of two accommodation portions 430 and one joint 440. The two accommodation portions 430 may sandwich an object X to be kept cold from the upper and lower directions in the inside of the logistic packaging container body 210. For example, when a sample such as cells is stored, the sample may be placed in a container having a small thickness, such as a dish. It can be said that the method for using the logistic packaging container 500 shown in FIG. 16 is suitable for cooling an object to be kept cold in such a shape.

Figure 17:
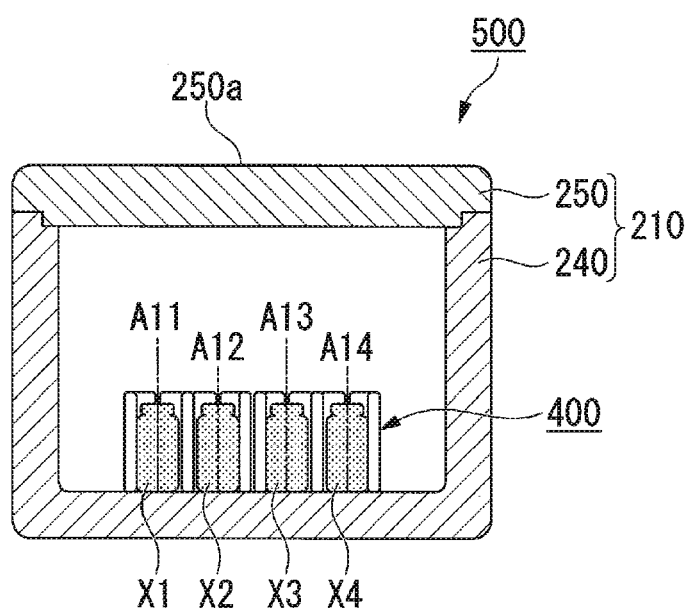
FIG. 17 is a conceptual diagram illustrating a method for using the logistic packaging container 500 when a tubular article is cooled as an object X to be kept cold.
Figure 18:
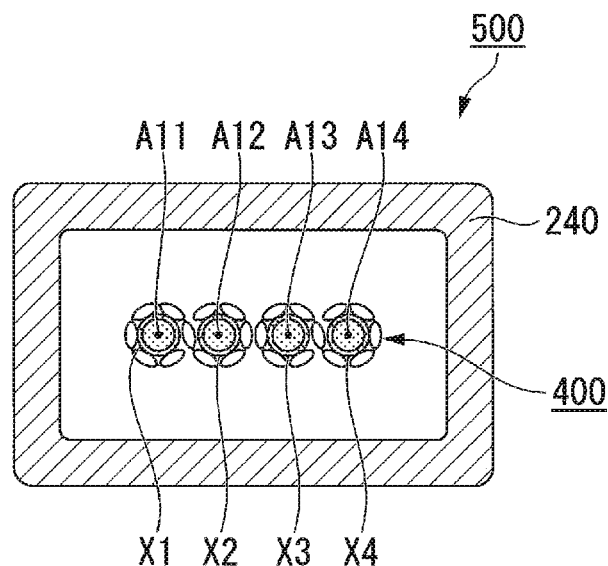
FIG. 18 is a top view in the field viewed from the top surface 250a side of the lid portion 250 shown in FIG. 17.

FIG. 17 is a conceptual diagram illustrating a method for using the logistic packaging container 500 when a tubular article, for example, medicine such as a specimen and a vaccine or a beverage can, is cooled as an object X to be kept cold. FIG. 18 is a top view in the field viewed from the top surface 250a side of the lid portion 250 of FIG. 17. However, FIG. 18 briefly illustrates the lid portion 250.

FIG. 17 shows a logistic packaging container 500 including four cold storage tools 400. Here, axes A11 to A14 that respectively penetrate the four objects X1 to X4 to be kept cold are assumed. In the logistic packaging container 500, the four objects X1 to X4 to be kept cold may be surrounded by four cold storage tools 400, respectively, along circumferential directions of the axes A11 to A14. Consequently, the object X1 to X4 to be kept cold can be cooled from the side face side inside the logistic packaging container body 210.

Figure 19:
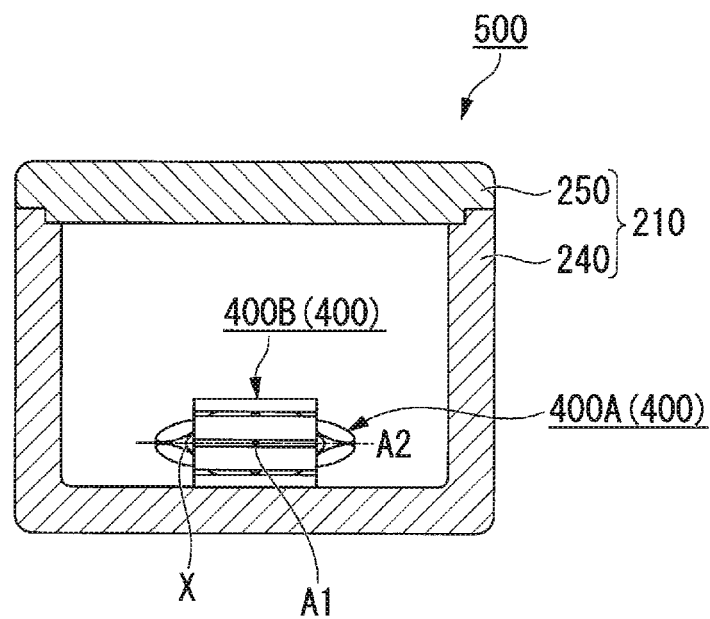
FIG. 19 is a conceptual diagram illustrating a method for using the logistic packaging container 500 of the third embodiment.

FIG. 19 is a conceptual diagram illustrating a method for using the logistic packaging container 500 of the third embodiment. FIG. 19 shows a logistic packaging container 500 including two cold storage tools 400. Here, axes A1 and A2 that penetrate the object X to be kept cold are assumed. In the present embodiment, the axis A2 corresponds the "second axis". The axis A1 and the axis A2 cross each other. In the logistic packaging container 500, the object X to be kept cold may be surrounded by each of the two cold storage tools 400 along circumferential directions of the axes A1 and A2. Specifically, the object X to be kept cold is surrounded by one cold storage tool 400A along a circumferential direction of the axis A1 and is surrounded by the other cold storage tool 400B along a circumferential direction of the axis A2. Consequently, it is possible to prevent heat inflow from the air in the vicinity of the object X to be kept cold. Accordingly, in the using method shown in FIG. 19, the cold insulation performance is high compared to a method by surrounding the object X to be kept cold with the cold storage tool 400 along a circumferential direction of the axis A1 only. In addition, the object X to be kept cold can be maintained at a temperature extremely close to the melting temperature of the latent heat storage material of the cold storage tool 400.

Fourth Embodiment

Cold Storage Tool

A cold storage tool using the above-described latent heat storage material will now be described based on FIGS. 20 and 21.

Figure 20:
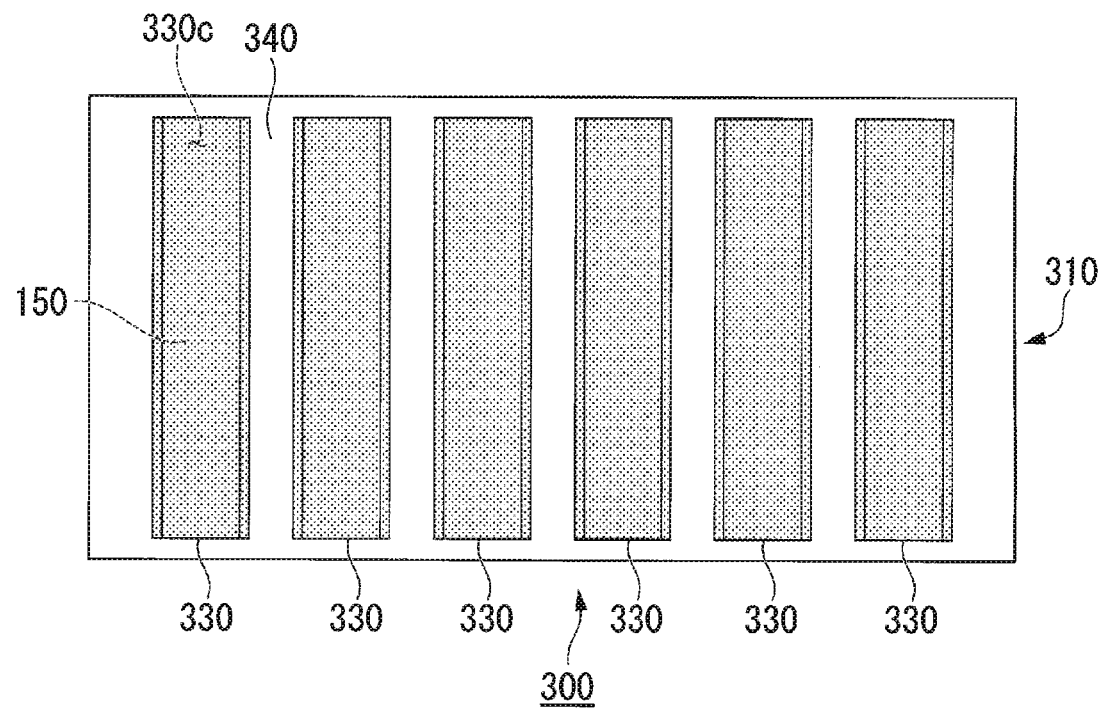
FIG. 20 is a plan view showing a cold storage tool 300 of a fourth embodiment.

FIG. 20 is a plan view showing a cold storage tool 300 according to a fourth embodiment. FIG. 21 is a cross-sectional view of FIG. 20. As shown in FIGS. 20 and 21, the cold storage tool 300 of the present embodiment includes a latent heat storage material 150 and a cold storage tool body 310. The cold storage tool 300 is a so-called blister pack type cold storage tool. Accordingly, components in the present embodiment common to those in the second embodiment are designated by the same reference numerals, and detailed description thereof will be omitted.

The cold storage tool body 310 includes a plurality of accommodation portions 330 and a plurality of joints 340.

The accommodation member 320 accommodates the latent heat storage material 150 in each interior space 330c in a liquid-tight state.

The accommodation member 320 is formed in a strip form. In FIG. 21, although the accommodation portions 330 each have a cross-section in an elliptical contour shape, the cross-section may be another shape.

Figure 21:
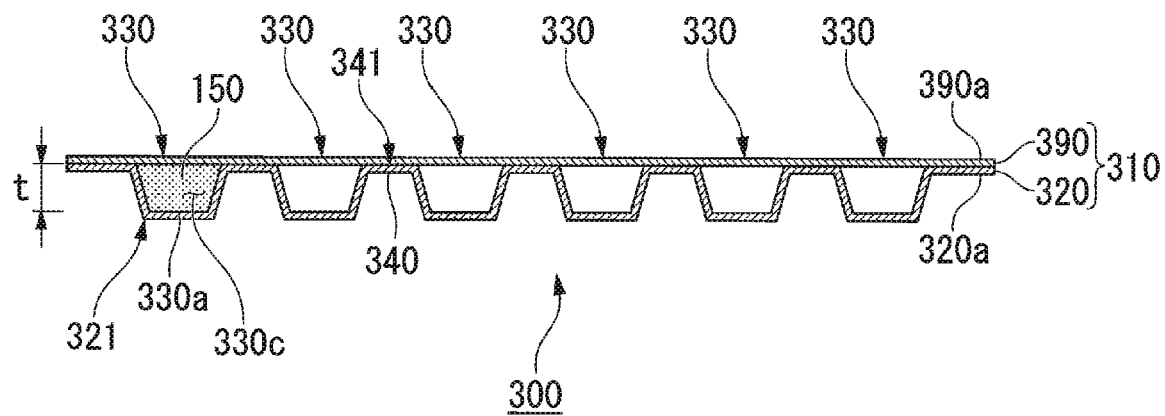
FIG. 21 is a cross-sectional view of the cold storage tool 300 shown in FIG. 20.

Incidentally, although the number of the accommodation portions 330 in FIGS. 20 and 21 is six, the number is not limited thereto. The size of the cold storage tool 300 can be changed according to the size of an object to be kept cold by changing the number of the accommodation portions 330.

In addition, the plurality of accommodation portions 330 may accommodate one kind of latent heat storage material 150 or may accommodate different latent heat storage materials 150 formed by two or more kinds of latent heat storage materials having different melting start temperatures. A plurality of objects to be kept cold having different storage temperatures can be simultaneously cooled by using such a cold storage tool 300.

In order to increase the area in contact with a beverage can, the contact surface 330a of the accommodation portion 330 may be formed in a concave face. In addition, in order to fit the cold storage tool 300 to, for example, a wine bottle, the thickness t of the accommodation portion 330 may change in the longitudinal direction of the accommodation portion 330.

The joint 340 connects two accommodation portions 330 with each other and also has a joint function. The cold storage tool 300 has a plurality of joints 340 and thereby can come into contact with an object to be kept cold in a posture along the shape of the object to be cooled down (object to be kept cold) even if the latent heat storage material 150 is in a solid phase state. Accordingly, even if the object to be kept cold has a complicated shape, the cold storage tool 300 can effectively cool down the object to be cooled.

As shown in FIG. 21, the cold storage tool body 310 is constituted of an accommodation member 320 and a sealing member 390. The accommodation member 320 and the sealing member 390 are joined to each other with a plurality of joining portions 341. The region where the accommodation member 320 and the sealing member 390 overlap with the joining portion 341 in a planar view functions as the joint 340. The region where the accommodation member 320 and the sealing member 390 not overlap with the plurality of joining portions 341 in a planar view functions as the accommodation portion 330.

The accommodation member 320 includes a plurality of concaves 321. The plurality of concaves 321, together with the sealing member 390, constitute the plurality of accommodation portions 330. The accommodation member 320 is preferably formed by a material having a hardness capable of retaining the shape of the concave 321.

The sealing member 390 is formed in a planar shape.

The accommodation member 320 and the sealing member 390 are each preferably formed by a material that can prevent leakage and volatilization of the latent heat storage material 150. Furthermore, the accommodation member 320 and the sealing member 390 are each preferably formed by a material having softness that imparts a joint function to the joint 340. Furthermore, the accommodation member 320 and the sealing member 390 are preferably formed by materials that can be bonded to each other in the manufacturing method described later.

The material for forming the accommodation member 320 is preferably, for example, polyethylene, polypropylene, polyamide, polyester, polycarbonate, or polyvinyl chloride. The thickness of the accommodation member 320 is preferably, for example, 100 μm or more and 1000 μm or less. When the thickness of the accommodation member 320 is within the above-mentioned range, the accommodation member 320 has flexibility. As a result, it is possible to impart a joint function to the joint 340.

The material for forming the sealing member 390 is preferably, for example, polyethylene, polypropylene, polyamide, or polyester. The thickness of the sealing member 390 is preferably 50 μm or more and 100 μm or less. When the thickness of the sealing member 390 is within the above-mentioned range, the sealing member 390 has flexibility. As a result, it is possible to impart a joint function to the joint 340.

The accommodation member 320 and the sealing member 390 may be each formed by a single material or an arbitrary combination of two or more materials. In addition, the accommodation member 320 and the sealing member 390 may be each constituted of a single layer or multiple layers.

The accommodation member 320 and the sealing member 390 are each preferably constituted of a multilayer film composed of a linear low-density polyethylene resin layer and a polyamide resin layer. In this case, the joint 340 can be formed by stacking two multilayer films such that the low-density polyethylene resin layers face each other and thermocompression-bonding the contact surfaces of the low-density polyethylene resin layers to each other.

At least one of the accommodation member 320 and the sealing member 290 preferably includes a thin film of aluminum or silicon dioxide in order to enhance the durability and the barrier property. Furthermore, it is preferable to attach a sticker of a temperature indicating material to at least one of the accommodation member 320 and the sealing member 390 because the temperature of the cold storage tool 300 can be judged.

The accommodation member 320 and the sealing member 390 may include a fixing portion. Consequently, the cold storage tool 300 can be arranged so as to surround an object to be kept cold. As the fixing portion, for example, a hook-and-loop fastener constituted of the surface 320a of the accommodation member 320 and the surface 390a of the sealing member 390 can be used.

Modification

Figure 22:
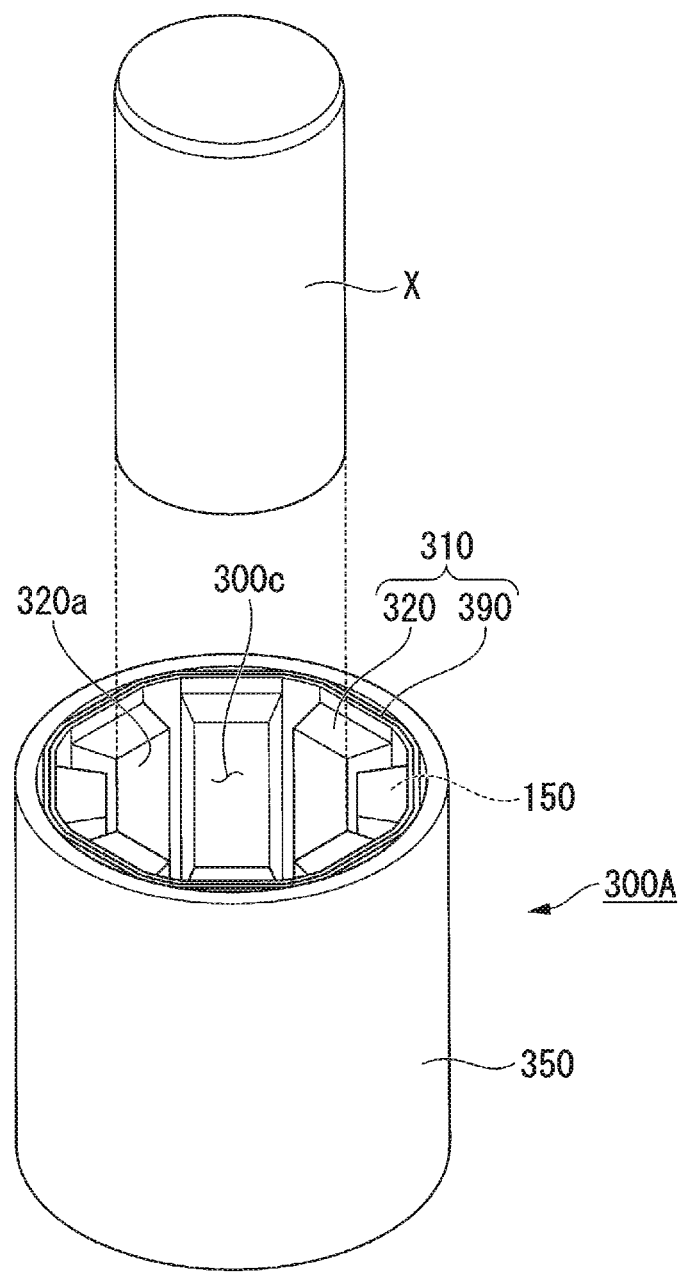
FIG. 22 is a perspective view showing a modification 300A of the cold storage tool of the fourth embodiment.

FIG. 22 is a perspective view showing a modification 300A of a cold storage tool according to the fourth embodiment. The cold storage tool 300A is different from the cold storage tool 300 of FIG. 20 in that the cold storage tool 300A includes a cold storage tool support 350.

The cold storage tool support 350 has a substantially cylindrical shape, and one end of the cylindrical shape is open. The cold storage tool support 350 has a space for accommodating the latent heat storage material 150 and the cold storage tool body 310 in the inside thereof. The cold storage tool body 310 is deformed into a substantially cylindrical shape with the accommodation member 320 inside and the sealing member 390 outside. The cold storage tool 300 is provided with the cold storage tool support 350, and thereby the cold storage tool 300 can stand by itself in a substantially cylindrical shape.

The cold storage tool support 350 is preferably formed by a material that has a heat insulating property and prevents heat exchange with the outside air. Examples of such a material include polyethylene foam, urethane foam, and chloroprene rubber (foam rubber).

Cooling Method

Figure 23:
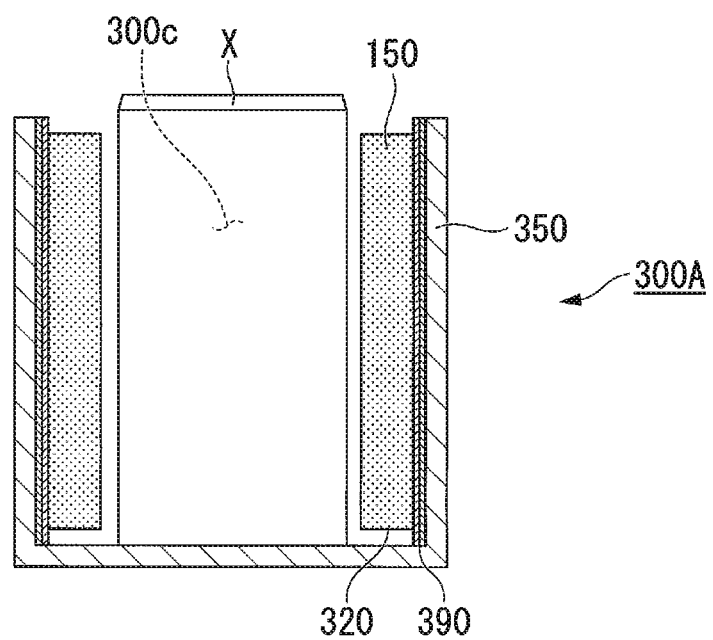
FIG. 23 is a conceptual diagram illustrating a method for using the cold storage tool 300A of the fourth embodiment.

FIG. 23 is a conceptual diagram illustrating a method for using the cold storage tool 300A of the fourth embodiment. As shown in FIG. 23, in the cooling method using the cold storage tool 300A of the fourth embodiment, an object X to be kept cold, such as a beverage can and a beverage bottle, is put in the substantially cylindrical space 300c of the cold storage tool 300A. Consequently, the object X to be kept cold and the cold storage tool 300A are brought near or into contact with each other. As a result, it is possible to maintain the object X to be kept cold at a temperature near the melting start temperature of the latent heat storage material 150 of the cold storage tool 300A. For example, a temperature of about 5° C. to 8° C., which is suitable for white wine, champagne, and sparkling wine, can be maintained.

In this case, it is preferable to form at least a part of the cold storage tool support 350 by a material having elasticity for giving a certain range to the diameter of the object X to be kept cold. The object X to be kept cold and the cold storage tool 300A come into contact with each other due to the elastic force of the cold storage tool support 350.

Method for Manufacturing Cold Storage Tool

Figure 24:
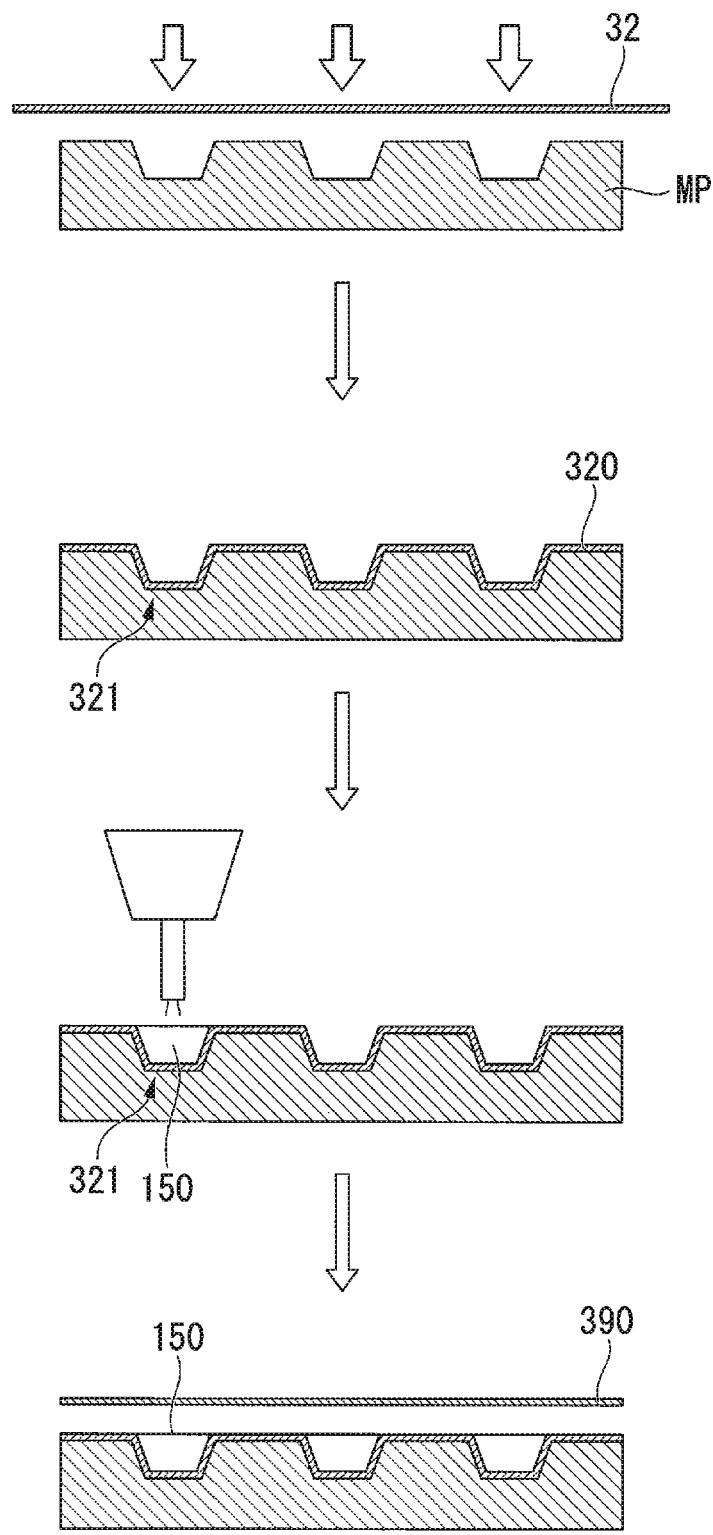
FIG. 24 is a conceptual diagram illustrating a process of manufacturing the cold storage tool 300 of the fourth embodiment.

An example of a method for manufacturing the cold storage tool 300 of the present embodiment will be described. FIG. 24 is a conceptual diagram illustrating a process of manufacturing the cold storage tool 300 of the fourth embodiment. Incidentally, FIG. 21 and FIG. 24 differ from each other in the number of the accommodation portions 330.

First, a rigid film 32, which is a raw material of an accommodation member 320, is placed in a mold MP having a groove of which the cross-sectional contour shape is a trapezoid and is molded into an accommodation member 320 by vacuum molding or pressing. Secondly, a certain amount of a latent heat storage material 150 in the liquid phase state is injected into the concave 321 of the accommodation member 320 using a pump or the like. Then, a sealing member 390 is disposed on the accommodation member 320, and the contact surfaces of the accommodation member 320 and the sealing member 390 are thermocompression-bonded to each other to form an accommodation portion 330 and a joint 340.

Logistic Packaging Container

A logistic packaging container using the cold storage tool 300 of the fourth embodiment will now be described based on FIG. 25.

Figure 25:
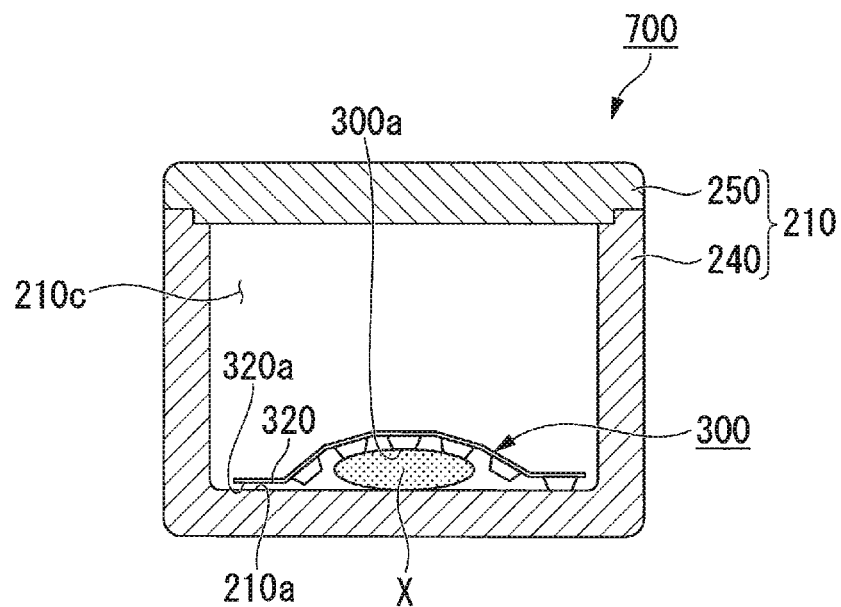
FIG. 25 is a cross-sectional view of a logistic packaging container 700 of the fourth embodiment.

FIG. 25 is a cross-sectional view of a logistic packaging container 700 according to the fourth embodiment. The logistic packaging container 700 includes a logistic packaging container body 210 and a cold storage tool 300. Accordingly, components in the present embodiment common to those in the second embodiment are designated by the same reference numerals, and detailed description thereof will be omitted.

The logistic packaging container 700 covers an object X to be kept cold from the top using the cold storage tool 300. Consequently, the logistic packaging container 700 can bring at least a part of the cold storage tool 300 into contact with the object X to be kept cold in the inside of the logistic packaging container body 210. It is inferred that thermal conduction occurs in the contact surfaces 300a of the object X to be kept cold and the cold storage tool 300 to cool down the object X to be kept cold. In this case, there is almost no influence by heat inflow from the outside into the logistic packaging container 700. Accordingly, the logistic packaging container 700 can efficiently cool the object X to be kept cold.

In addition, the logistic packaging container 700 of the present embodiment can cool an object X to be kept cold at a temperature near the melting start temperature (5° C. or more and 8° C. or less) of the latent heat storage material of the cold storage tool 300. Studies by the present inventors revealed that an object X to be kept cold can be cooled within a range of 6° C. to 8° C. Accordingly, the logistic packaging container 700 is suitable for cooling and transporting medicine that requires strict temperature control and for cooling and transporting greengrocery that is apt to cause low temperature damage.

In the logistic packaging container 700 of the present embodiment, the surface 320a of the accommodation member 320 and the surface 210a of the logistic packaging container body 210 can be fixed with, for example, a hook-and-loop fastener.

Incidentally, the logistic packaging container 700 may include a thermal insulation member in the upper portion of the cold storage tool 300 for enhancing the performance of cooling an object X to be kept cold.

Since the logistic packaging container 700 of the fourth embodiment includes the above-described cold storage tool 300, it can be used also for cooling greengrocery and refrigerated products and also for cooling medicine.

Fifth Embodiment

Food Cold Storage Tool

A food cold storage tool using the above-described latent heat storage material will now be described based on FIG. 26.

Figure 26:
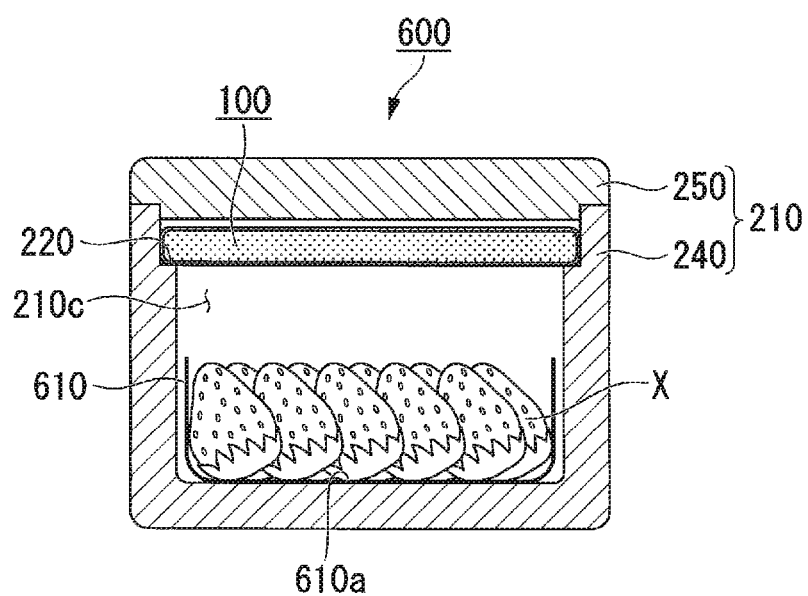
FIG. 26 is a conceptual diagram illustrating a method for using a food cold storage tool 600 of a fifth embodiment.

FIG. 26 is a conceptual diagram illustrating a method for using a food cold storage tool 600 of a fifth embodiment. The food cold storage tool 600 includes a logistic packaging container body 210, a cold storage tool 100, and inner container 610. Accordingly, components in the present embodiment common to those in the second embodiment are designated by the same reference numerals, and detailed description thereof will be omitted.

The inner container 610 holds food. In the food cold storage tool 600, fresh food, such as meat and fish, and greengrocery, such as vegetables and fruits, accommodated in the logistic packaging container body 210 can be prevented from coming into direct contact with each other by the inner container 610. Consequently, it is possible to suppress secondary contamination by food poisoning bacteria. The surface 610a of the inner container 610 is preferably coated by an antibacterial agent or the like.

Since the food cold storage tool 600 of the fifth embodiment includes the above-described cold storage tool 100, it can be used also for cooling greengrocery and refrigerated products and also for cooling medicine.

Although preferred embodiments according to the present invention have been described above with reference to the accompanying drawings, the present invention is not limited these examples. The shapes and combinations of the constituent members shown in the above-described examples are merely examples, and various modifications can be made based on design requirements and so on without departing from the gist of the present invention.

For example, the logistic packaging container 200 of the second embodiment may also use the cold storage tool 300 of the fourth embodiment or the cold storage tool 400 of the third embodiment.

The food cold storage tool 600 of the fifth embodiment may include the cold storage tool 300 of the fourth embodiment or the cold storage tool 400 of the third embodiment as a cold storage tool.

The cold storage tool 400 of the third embodiment may include a cold storage tool support.

EXAMPLES

The present invention will now be described by examples but is not limited to these examples.

Measurement of Melting Start Temperature and Melting Temperature of Latent Heat Storage Material The melting start temperature and the melting temperature of a latent heat storage material were determined by the following methods. First, about 5 g of a latent heat storage material was weighed and was poured in a glass tube bottle. The temperature of the central portion of the latent heat storage material in the glass tube bottle was measured with a thermocouple, and the glass tube bottle was accommodated in a thermostat having a temperature adjustment function under room temperature. Secondly, the temperature inside the thermostat was cooled down to −20° C. to freeze the latent heat storage material, and the temperature was raised from −20° C. to 30° C. at a rate of 0.25° C./min. On this occasion, the time at which the temperature started to rise was defined as 0 hour, and a graph of melting behavior of the latent heat storage material with respect to the temperature rising time was obtained.

In the resulting graph of melting behavior, the temperature of the latent heat storage material was differentiated by the temperature rising time, and the temperature of the latent heat storage material at the time giving a differential value of zero earliest during the measurement time was defined as the melting start temperature.

The temperature of the latent heat storage material at the time giving a differential value of zero latest during the measurement time was defined as the melting end temperature.

The intermediate temperature between the determined melting start temperature and melting end temperature was defined as the melting temperature.

Measurement of Latent Heat Amount of Latent Heat Storage Material

As the latent heat amount per unit mass of the latent heat storage material, the value obtained by differential scanning calorimetry (DSC) was employed. Specifically, about 4 mg of a latent heat storage material in a liquid phase state was enclosed in an aluminum pan for DSC measurement. The temperature of the enclosed latent heat storage material was lowered at a rate of 5° C./min to change the phase from the liquid phase state to the solid phase state, and the temperature was then raised at a rate of 5° C./min. An endothermic peak appeared in the DSC curve when the phase changed from the solid phase state to the liquid phase state by increasing the temperature of the latent heat storage material. The value obtained by dividing the area of the endothermic peak by the mass of the sample is defined as the latent heat amount per unit mass.

Preparation of Latent Heat Storage Material

Examples 1-1 to 1-9

TBAB and potassium nitrate were weighed at ratios shown in Table 1, and pure water was added thereto, followed by stirring with a mechanical stirrer at 600 rpm for 1 hour for complete dissolution. Thus, latent heat storage materials of Examples 1-1 to 1-9 were obtained.

Comparative Example 1-1

Water was used as the latent heat storage material of Comparative Example 1-1.

Comparative Example 1-2

TBAB was weighed, and pure water was added thereto, followed by stirring with a mechanical stirrer at 600 rpm for 1 hour for complete dissolution. Thus, a latent heat storage material of Comparative Example 1-2 was obtained. On this occasion, the molar ratio of water to TBAB was 26.8.

Reference Example 1-1

TBAN was weighed, and pure water was added thereto, followed by stirring with a mechanical stirrer at 600 rpm for 1 hour for complete dissolution. Thus, a latent heat storage material of Reference Example 1-1 was obtained. On this occasion, the molar ratio of water to TBAN was 26.5.

Figure 27:
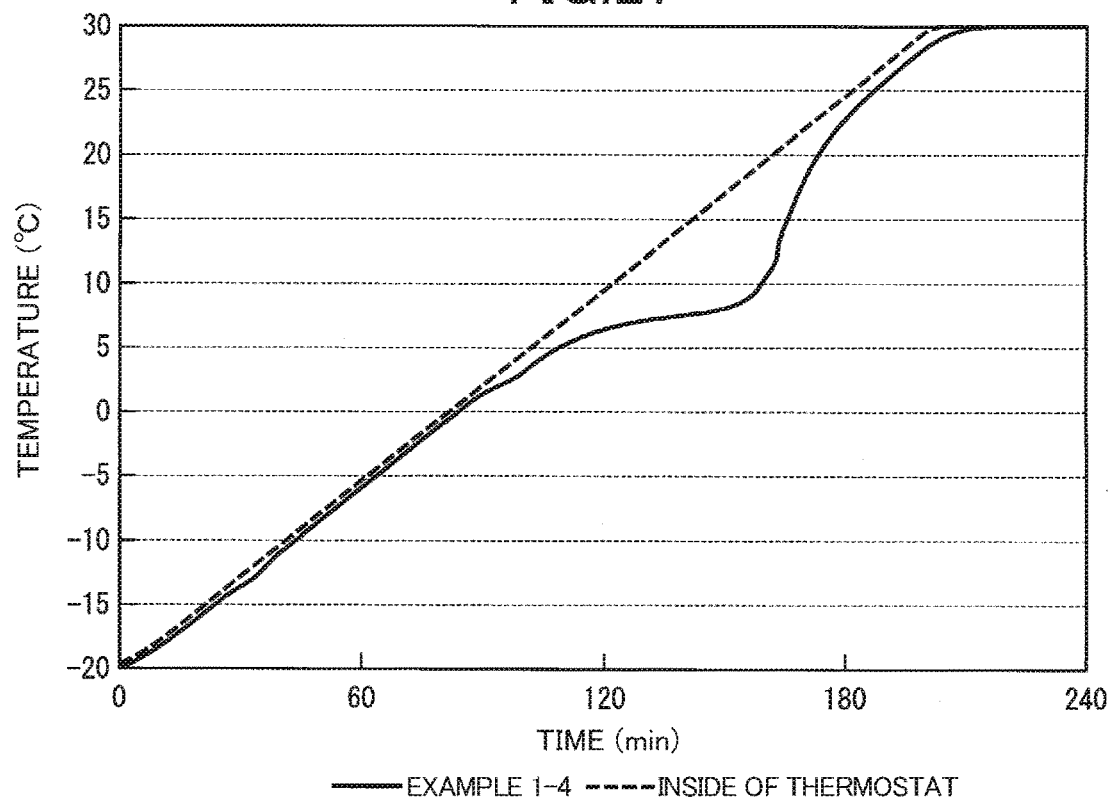
FIG. 27 is a graph showing the melting behavior of the latent heat storage material of Example 1-4 when the temperature of the thermostat was increased under the conditions for measuring the melting start temperature and the melting temperature.
Figure 28:
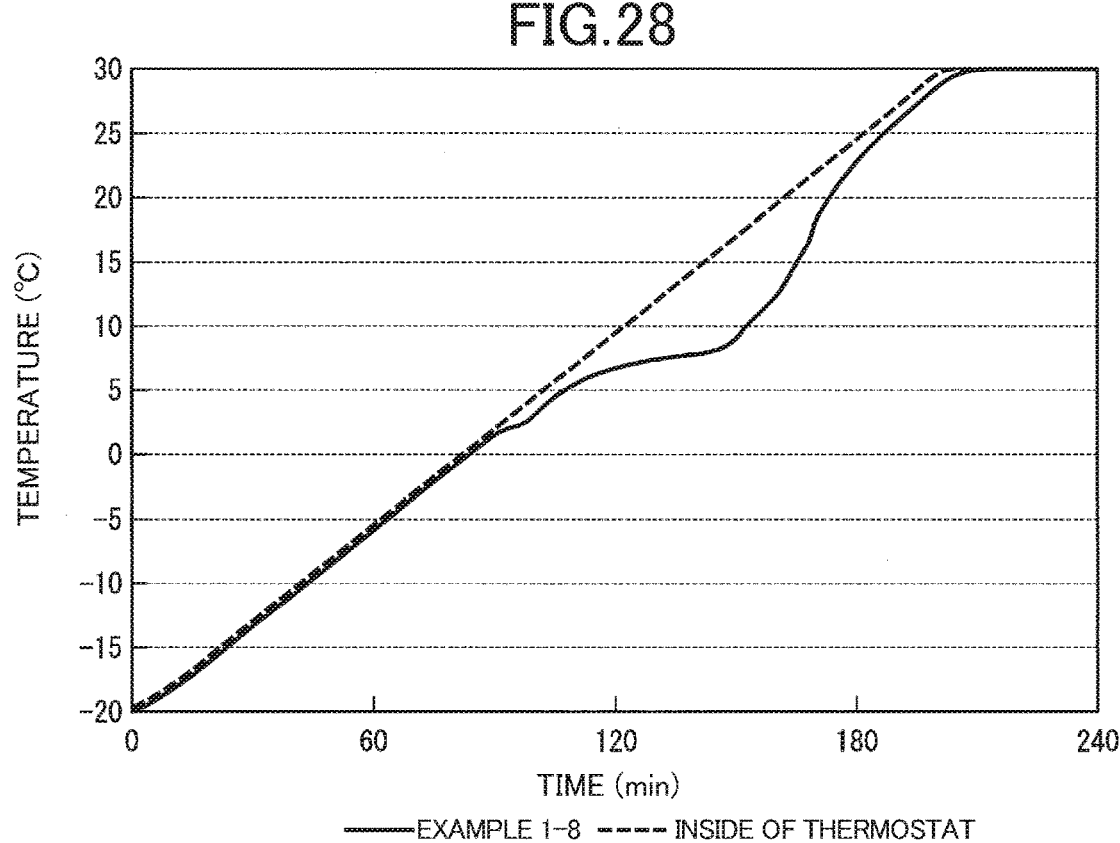
FIG. 28 is a graph showing the melting behavior of the latent heat storage material of Example 1-8 when the temperature of the thermostat was increased under the conditions for measuring the melting start temperature and the melting temperature.

FIG. 27 is a graph showing the melting behavior of the latent heat storage material of Example 1-4 when the temperature of the thermostat was increased under the conditions for measuring the melting start temperature. FIG. 28 is a graph showing the melting behavior of the latent heat storage material of Example 1-8 when the temperature of the thermostat was increased under the conditions for measuring the melting start temperature. In FIGS. 27 and 28, the vertical axis of the graph represents temperature, and the horizontal axis of the graph represents measurement time. The solid line in the graph shows the melting behavior of the latent heat storage material. The broken line in the graph shows the actual change in room temperature of the thermostat.

As shown in FIGS. 27 and 28, although the temperature in the thermostat rose from about 100 to 150 minutes after the start of measurement, the temperatures of the latent heat storage materials of Example 1-4 and Example 1-8 were substantially constant at about 7° C.

Based on this, it was demonstrated that the latent heat storage material to which an aspect of the present invention was applied underwent a phase change from the solid phase state to the liquid phase state while absorbing heat during the above-mentioned time.

In addition, as obvious also from FIGS. 27 and 28, changes in temperature of the latent heat storage material were observed at about 12° C., which is the melting temperature of the clathrate hydrate of TBAB and at about −3° C., which is the melting temperature of the eutectic crystal of potassium nitrate and water.

That is, it was expected that the temperature of a heat storage material would become a temperature near 12° C. or 3° C. for a certain time with an increase in temperature in the thermostat caused by the clathrate hydrate of TBAB or the eutectic crystal of potassium nitrate and water. However, contrary to the expectation, the temperature of the heat storage material did not become a temperature near 12° C. or 3° C. for a certain time and instead became a temperature near 7° C. for a certain time. Incidentally, the fact that the temperature becomes near 7° C. for a certain time is due to the latent heat storage material.

Based on this, it can be said that the latent heat storage material of the present example is a crystalline compound in the solid phase state formed by $TBA^+$ and Br-constituting TBAB, $K^+$ and $NO_3^-$ constituting potassium nitrate, and water. In addition, it was demonstrated that this crystalline compound is dissociated at about 7° C.

Table 1 shows the melting start temperatures and latent heat amounts of the latent heat storage materials of Examples 1-1 to 1-9, Comparative Example 1-1, and Reference Example 1-1.

TABLE 1

| | Molar ratio with respect to TBAB | | Melting start temperature (° C.) | Melting temperature (° C.) | Latent heat amount (J/g) |
|---|---|---|---|---|---|
| | Potassium nitrate | Water | | | |
| Example 1-1 | 0.7 | 26.8 | 6.0 | 7.3 | 196 |
| Example 1-2 | 0.7 | 29.2 | 6.2 | 7.3 | 190 |
| Example 1-3 | 0.3 | 26.8 | 5.5 | 7.2 | 177 |
| Example 1-4 | 0.5 | 26.8 | 5.9 | 7.0 | 186 |
| Example 1-5 | 0.7 | 24.7 | 5.8 | 7.2 | 179 |
| Example 1-6 | 0.9 | 29.2 | 6.9 | 7.2 | 184 |
| Example 1-7 | 0.9 | 26.8 | 6.4 | 7.3 | 189 |
| Example 1-8 | 1 | 26.8 | 6.9 | 7.3 | 170 |
| Example 1-9 | 1.2 | 25.2 | 5.8 | 7.5 | 168 |
| Comparative Example 1-1 | Water only | | −0.5 | 0.0 | 333 |
| Comparative Example 1-2 | None | 26.8 | 11.7 | 12.1 | 180 |
| Reference Example 1-1 | Clathrate hydrate of TBAN | | 4.9 | 5.5 | 167 |

As shown in Table 1, the melting start temperatures and the melting temperatures of the latent heat storage materials of Examples 1-1 to 1-9 to which an aspect of the present invention was applied were higher than 5° C. and 10° C. or less.

In contrast, the melting start temperature of the latent heat storage material of Comparative Example 1-1 to which the present invention was not applied was 5° C. or less. In addition, the melting start temperature of the latent heat storage material of Comparative Example 1-2 to which the present invention was not applied was higher than 10° C.

In addition, the latent heat amounts of the latent heat storage materials of Examples 1-1 to 1-9 to which an aspect of the present invention was applied were 168 J/g or more.

The latent heat amounts of the latent heat storage materials of Examples 1-1 to 1-9 were higher than the latent heat amount of the clathrate hydrate of TBAN (Reference Example 1-1), which has been known as a material having a melting start temperature within a temperature range of higher than 5° C. and 10° C. or less.

Production of Logistic Packaging Container

Example 2-1

A logistic packaging container (baggage compartment volume: 7 L, made of styrene foam) having the same configuration as that of the logistic packaging container 200C of FIG. 9 was produced. The latent heat storage material (1.3 L) of Example 1-1 was enclosed in a blow container type cold storage tool.

Comparative Example 2-1

A logistic packaging container of Comparative Example 2-1 was produced as in Example 2-1 except that the latent heat storage material of Comparative Example 1-1 was used as the latent heat storage material.

Evaluation

An object to be kept cold prepared by enclosing 100 g of water in a film pack was placed in each of the logistic packaging containers of Example 2-1 and Comparative Example 2-1. These logistic packaging containers were cooled in a refrigerating room of an environmental temperature of 5° C. for 18 hours and were further left to stand in an environment of 30° C. for 36 hours, while tracing the change in temperature of the object to be kept cold. The temperature was measured with a chip type temperature logger, Thermoclone. The results are shown in FIG. 29.

Figure 29:
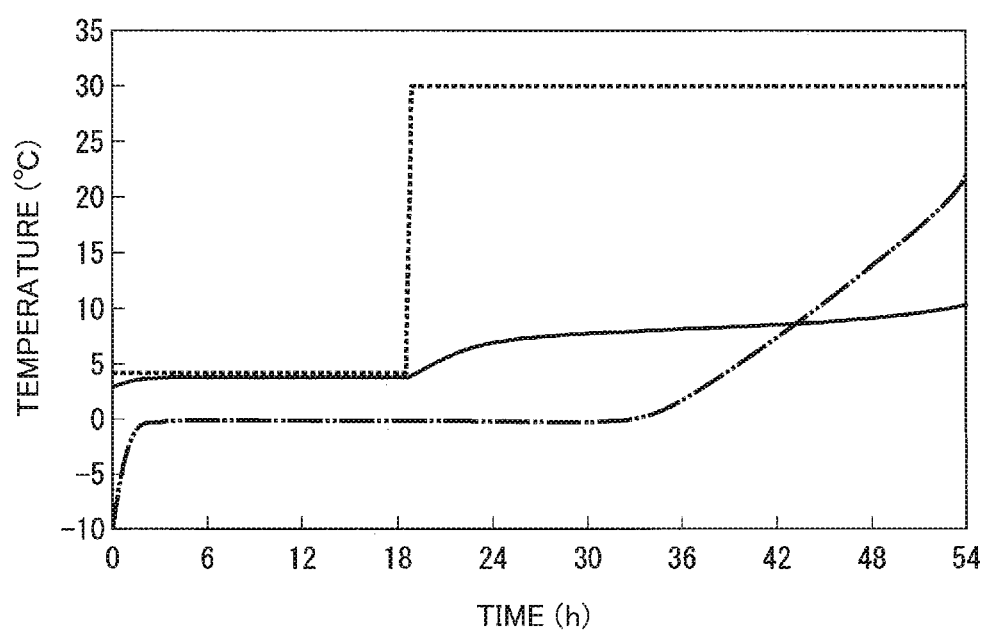
FIG. 29 is a graph showing changes in temperature of an object to be kept cold stored in the logistic packaging containers of Example 2-1 and Comparative Example 2-1.

FIG. 29 is a graph showing changes in temperature of an object to be kept cold stored in the logistic packaging containers of Example 2-1 and Comparative Example 2-1. In FIG. 29, the vertical axis of the graph represents temperature, and the horizontal axis of the graph represents measurement time. The solid line in the graph shows the temperature history of the object to be kept cold in the logistic packaging container of Example 2-1. The two-dot chain line in the graph shows the temperature history of the object to be kept cold in the logistic packaging container of Comparative Example 2-1. The broken line of the graph shows the environmental temperature.

As shown in FIG. 29, the total period in which the temperature of the object to be kept cold in the logistic packaging container of Example 2-1 was 10° C. or less was 54 hours. It is inferred that since the latent heat storage material of Example 1-1 used in the logistic packaging container of Example 2-1 does not melt under an environment of 5° C., the logistic packaging container of Example 2-1 could cool for a long time. The logistic packaging container of Example 2-1 maintains a temperature of 2° C. or more and 10° C. or less and is suitable for cooling and transporting greengrocery and refrigerated products.

In contrast, the temperature of the object to be kept cold in the logistic packaging container of Comparative Example 2-1 drastically increased after about 33 hours from the start of measurement. As a result, the period in which the temperature of the object to be kept cold in the logistic packaging container of Comparative Example 2-1 was 10° C. or less was about 43 hours. The melting start temperature of the latent heat storage material of Comparative Example 1-1 used in the logistic packaging container of Comparative Example 2-1 is −0.5° C. and melts under an environment of 5° C. Accordingly, the latent heat storage material completely melted when about 33 hours elapsed from the start of measurement. It is inferred that as a result, the temperature of the object to be kept cold increased. Based on the above, it is inferred that cooling and transportation for a long time by the logistic packaging container of Comparative Example 2-1 was difficult.

Example 2-2

A logistic packaging container (baggage compartment volume: 15 L, made of styrene foam) having the same configuration as that of the logistic packaging container 500 of FIG. 19 was produced. The latent heat storage material (50 g) of Example 1-1 was injected to each accommodation portion of a film pack type cold storage tool having 12 accommodation portions. Two cold storage tools were thus prepared and were frozen in a freezer of −18° C. and were then cooled in a refrigerator of 3° C. to 5° C.

Comparative Example 2-2

A cold storage tool was disposed so as to cover an object to be kept cold as in Example 2-2 except that the latent heat storage material of Comparative Example 1-1 was used as the latent heat storage material and that the cold storage tool was used in the state frozen in a freezer of −18° C.
Evaluation A leaf vegetable was used as an object to be kept cold, and the leaf vegetable was surrounded by cold storage tools from two directions and was placed inside the logistic packaging container of Example 2-2 or Comparative Example 2-2. These logistic packaging containers were cooled in a refrigerating room of an environmental temperature of 5° C. for 18 hours and were then further left to stand in an atmosphere of 30° C. for 12 hours, while tracing change in temperature of the object to be kept cold. In addition, the appearances of the object to be kept cold before and after cooling were compared. The temperature was measured with a chip type temperature logger, Thermoclone.

The temperature of the object to be kept cold in the logistic packaging container of Example 2-2 was maintained within a range of 6° C. to 7° C. during the cooling period. In addition, in the logistic packaging container of Example 2-2, there was no change in the appearance of the object to be kept cold after cooling. Accordingly, it can be said that the logistic packaging container of Example 2-2 does not cause low temperature damage in greengrocery (leaf vegetable) and is suitable for cooling and transportation for a long time.

In contrast, in the logistic packaging container of Example 2-2, the temperature of the object to be kept cold in the initial period of cooling was −10° C. Subsequently, the temperature of the object to be kept cold increased to 0° C., which is the melting temperature of the latent heat storage material used in Comparative Example 2-2. As a result, in the logistic packaging container of Comparative Example 2-2, cold storage was performed at 0° C. or less for 8 hours in the cooling period.

In addition, in the logistic packaging container of Comparative Example 2-2, there was a change in the appearance of the object to be kept cold after cooling. Specifically, the leaf vegetable as the object to be kept cold was damaged and discolored. It is inferred that this is the result caused by low temperature damage of the greengrocery (leaf vegetable) by using a material (water has a melting start temperature of −0.5° C. and a melting point of 0° C.) having a melting start temperature and a melting temperature not higher than the lower limit (0° C.) of the temperature for maintaining the object to be kept cold. Accordingly, it is said that the logistic packaging container of Comparative Example 2-2 is not suitable for cooling and transportation.

From the above, it was demonstrated that the present invention is useful.

The invention claimed is:

1. A latent heat storage material comprising:
   a tetrabutylammonium ion and a bromide ion constituting a tetrabutylammonium bromide;
   a potassium ion and a nitrate ion constituting a potassium nitrate; and
   water, wherein
   a molar ratio of the potassium nitrate to the tetrabutylammonium bromide is 0.3 or more and 1.3 or less, and
   a molar ratio of the water to the tetrabutylammonium bromide is 22 or more and 32 or less.

2. The latent heat storage material according to claim 1, wherein
   the molar ratio of the potassium nitrate to the tetrabutylammonium bromide is 0.5 or more and 0.8 or less, and
   the molar ratio of the water to the tetrabutylammonium bromide is 24 or more and 30 or less.

3. The latent heat storage material according to claim 1, wherein
   the molar ratio of the potassium nitrate to the tetrabutylammonium bromide is 0.6 or more and 1.0 or less, and
   the molar ratio of the water to the tetrabutylammonium bromide is 26 or more and 32 or less.

4. The latent heat storage material according to claim 1, wherein
   the molar ratio of the potassium nitrate to the tetrabutylammonium bromide is 0.6 or more and 0.8 or less, and
   the molar ratio of the water to the tetrabutylammonium bromide is 26 or more and 30 or less.

5. A cold storage tool comprising the latent heat storage material according to claim 1 and an accommodation portion for accommodating the latent heat storage material in a liquid-tight state.

6. The cold storage tool according to claim 5, further comprising:
   a plurality of accommodation portions, including the accommodation portion; and
   a joint for connecting the plurality of accommodation portions to each other.

7. A logistic packaging container comprising the cold storage tool according to claim 5.

8. The logistic packaging container according to claim 7, further comprising a holding member for holding the cold storage tool.

9. A logistic packaging container comprising the cold storage tool according to claim 6.

10. A cooling method using the cold storage tool according to claim 5, comprising:
    surrounding an object to be kept cold with the cold storage tool along a circumferential direction of a first axis that passes through the object to be kept cold.

11. The cooling method according to claim 10, further comprising:
    further surrounding the object to be kept cold with the cold storage tool along a circumferential direction of a second axis passing through the object to be kept cold and to intersect the first axis.

* * * * *